United States Patent
Bernini et al.

(10) Patent No.: US 10,433,209 B2
(45) Date of Patent: Oct. 1, 2019

(54) AUTOMATIC METHOD FOR MOBILITY LOAD BALANCING IN MOBILE TELECOMMUNICATIONS NETWORKS

(71) Applicant: TELECOM ITALIA S.p.A., Milan (IT)

(72) Inventors: Antonio Bernini, Turin (IT); Andrea Buldorini, Turin (IT); Giuseppe Minerva, Turin (IT); Andrea Schiavoni, Turin (IT); Isabella Vario, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 0 days.

(21) Appl. No.: 15/739,810

(22) PCT Filed: Jun. 30, 2015

(86) PCT No.: PCT/EP2015/064789
§ 371 (c)(1),
(2) Date: Dec. 26, 2017

(87) PCT Pub. No.: WO2017/000986
PCT Pub. Date: Jan. 5, 2017

(65) Prior Publication Data
US 2018/0192324 A1    Jul. 5, 2018

(51) Int. Cl.
*H04W 28/08* (2009.01)
*H04W 24/02* (2009.01)
*H04W 36/22* (2009.01)

(52) U.S. Cl.
CPC .......... *H04W 28/08* (2013.01); *H04W 24/02* (2013.01); *H04W 36/22* (2013.01)

(58) Field of Classification Search
None
See application file for complete search history.

(56) References Cited

U.S. PATENT DOCUMENTS

| | | | | |
|---|---|---|---|---|
| 6,092,020 A | * | 7/2000 | Fastenrath | ........... G08G 1/0104 340/992 |
| 2002/0077113 A1 | * | 6/2002 | Spaling | ................ H04W 24/08 455/453 |

(Continued)

FOREIGN PATENT DOCUMENTS

EP    2169994 A2    3/2010

OTHER PUBLICATIONS

International Search Report and Written Opinion dated Mar. 9, 2016, in PCT/EP2015/064789, filed Jun. 30, 2015.

(Continued)

*Primary Examiner* — Ajay Cattungal
*Assistant Examiner* — Gautam Sharma
(74) *Attorney, Agent, or Firm* — Oblon, McClelland, Maier & Neustadt, L.L.P.

(57) ABSTRACT

A method (200; 600) of balancing a traffic load among at least apart of traffic managing entities (105;110) of a mobile telecommunication network (100) comprising a plurality of traffic managing entities (105;110) is proposed. The method comprises the following steps: collecting (205; 605) traffic-related data referred to said at least a part of traffic managing entities (105;110); identifying (220; 620) a first set of traffic managing entities (105;110) managing an excessive traffic load on the basis of such traffic-related data; identifying (220; 620) a second set of traffic managing entities (105;110) adapted to take charge of at least part of the excessive traffic load to which traffic managing entities (105;110) of first set of traffic managing entities (105;110) are subjected. Moreover, for each traffic managing entity (105;110) of the first set of traffic managing entities (105;110) the method comprises: determining (235-240; 630) at least one traffic managing entity (105;110) of the second set of traffic managing entities (105;110) adapted to take charge of at least part of (Continued)

the excessive traffic load managed by said traffic managing entity (105;110) of the first set of traffic managing entities (105;110); assigning (245; 635) at least part of the excessive traffic load to which said traffic managing entity (105;110) of first set of traffic managing entities (105; 10) is subjected to the determined at least one least one traffic managing entity (105;110) of the second set of traffic managing entities (105;110), and adjusting (245; 635) radio communication parameters of said traffic managing entity (105;110) of the first set of traffic managing entities (105; 10) and of said determined at least one traffic managing entity (105;110) of the second set of 20 traffic managing entities (105;110) thereby redistributing traffic load on the basis of such assigning.

22 Claims, 8 Drawing Sheets

(56) References Cited

U.S. PATENT DOCUMENTS

| | | |
|---|---|---|
| 2010/0062755 A1* | 3/2010 | Quilty .................. H04W 24/02 |
| | | 455/418 |
| 2010/0075682 A1 | 3/2010 | Del Rio-Romero et al. |
| 2012/0147760 A1* | 6/2012 | Duan .................. H04L 41/0816 |
| | | 370/252 |
| 2014/0242991 A1 | 8/2014 | Yanover et al. |

OTHER PUBLICATIONS

Hahn, et al., "Mobility Load Balancing—A Case Study: Simplified vs. Realistic Scenarios", Institute for Communications Technology Braunschweig. Germany, May 26-28, 2014, 6 pages.

* cited by examiner

AUTOMATIC METHOD FOR MOBILITY LOAD BALANCING IN MOBILE TELECOMMUNICATIONS NETWORKS

BACKGROUND OF THE INVENTION

Technical Field

The present invention generally relates telecommunications networks. Particularly, one embodiment of the present invention relates to mobile radio telecommunications networks such as for example mobile (cellular) telephony networks.

In detail, an embodiment of the present invention is referred to the aspects of automatic planning and optimisation of mobile telecommunications networks based on a SON—Self-Organising Networks paradigm. In more detail, an embodiment of the present invention proposes an automatic method for load balancing or Mobility Load Balancing (MLB) in telecommunications self-organizing mobile cellular networks (e.g. 2G, 3G and Long Term Evolution (LTE)/Long Term Evolution Advanced (LTE-A) mobile telecommunication networks) in order to guarantee an optimal distribution of the traffic load in the mobile telecommunication network.

Overview of the Related Art

Mobile telecommunication networks, for example mobile telephony networks such as Long Term Evolution (LTE) and LTE Advanced (LTE-A) mobile telephony networks, are moving towards an increasing complexity in order to provide users served by the mobile radio network with an increasing number of services and an exchange of data at increasing data rates.

In order to simplify the management complexity of such mobile telecommunication networks, Self-Organizing Networks (SON) have been proposed in the art.

Mobile telecommunication SON are mobile telecommunication networks adapted to configure and optimize the operation of network elements (e.g., radio base stations, relay nodes etc.) and of the whole operation of the mobile telecommunication network automatically.

In order to provide an optimised operation, mobile telecommunication SON configured for managing traffic load have been proposed in the art.

Generally, in the art traffic (or mobility) load balancing is often solved by means of the calculation of a traffic load of cells of the mobile telecommunication network based on information related to either an interferential condition (i.e., interferences perceived in the cells by communication signals) or to an occupation of specific group of resources (e.g., resource blocks).

For example in Sören Hahn et al.: "Reference Mobility Load Balancing—A Case Study: Simplified vs. Realistic Scenarios", Technische Universität Braunschweig Institut für Nachrichtentechnik Braunschweig discloses the use of traffic models. Particularly, a proposed traffic model comprises an indication of a "patience time" of users. Patience time computes the time the individual user is willing to wait for better radio communication conditions based on the respective service. Once this time is expired, the service is terminated with a bad experience for one user, but the side effect that more resources are available for other users in the system.

U.S. Pat. No. 8,676,186 discloses a cell load balancing method. The cell load balancing method includes: acquiring information of the load of a current cell and information of the load an adjacent cell; determining a target cell in which a mobility parameter needs to be modified thereof according to the information of the load of the current cell and the information of the load of the adjacent cell; sending a parameter modification request to the determined target cell; and performing a corresponding operation according to information indicating whether the parameter is successfully modified and fed back from the adjacent cell.

SUMMARY OF THE INVENTION

The Applicant has observed that, generally, method and systems known in the art provide unsatisfactory results with respect to the management of traffic load managed by network entities of a mobile telecommunication network, particularly traffic load in radio base stations of the mobile telecommunication network or (with a higher granularity) in one or more covered areas, and/or cells, managed by such radio base stations.

The Applicant has noticed that by considering parameters such as Signal-to-Interference-plus-Noise Ratio SINR or Physical Resource Block PRB occupation as a load indicator of a generic network entity do not allow estimating the effective load suffered by the radio bases station and/or cell in a simple and effective manner.

For example, by considering the SINR for a radio base station or a cell of the mobile telecommunication network it expresses the ratio between the useful signal and the total interference due both to effect of noise and interference coming from the other radio base stations and/or cells of the mobile telecommunication network. It should be apparent that the SINR parameter may assume different values for a same traffic load; in fact, the SINR depends on reciprocal interference among radio base stations and/or cells of the mobile telecommunication network, which depends on a power planning, a geographic position and other aspects related to the interfered and interfering radio base stations and/or cells. Therefore, the SINR parameter could lead to a misevaluation of the actual traffic load of radio base stations and/or cells of the mobile telecommunication network.

In case of PRB occupation, a relation between PRB occupation and, for example, a useful throughput per connection or traffic load is not easily determined. For example, in LTE-type cells, the total PRB occupation is proportional to a total cell throughput but not to the throughput of a generic user; in fact, the total amount of available PRB may be assigned a single user or the total amount of PRB may be subdivided among a plurality of users (e.g., 32 users), therefore a detected amount of allocated PRB is the same in both cases, but in the first case the single user transmit data with a high throughput, while in the second case the throughput of each user would be a fraction (e.g., 1/32) of the throughput experienced by the single user. Therefore, on the basis of the allocated PRB it is not possible to effectively distinguish between a low traffic load condition (e.g., the single user scenario) and a high traffic load condition (e.g., the plurality of user scenario).

The Applicant has found that a collection and elaboration of network data, for example network counters, already available in the network, and related to radio communication resources provided substantially in a real-time framework allows investigating and learning in a more effective manner the actual traffic load state of each radio base station or cell of the mobile telecommunication network, which allows performing an effective managing of the traffic load (i.e.

traffic load balancing) within radio base stations and/or cells of the mobile telecommunication network.

The Applicant has thus tackled the problem of defining a real-time traffic (or mobility) load balancing procedure in order to effectively manage the capacity of the available radio resources of a mobile telecommunication network.

According to the present invention, methods are proposed devoted to collect traffic-related data, e.g. traffic load counters, individuating radio base stations and/or cells of the mobile telecommunication network in critical conditions on the basis of an actual traffic load, identifying radio base stations and/or cells of the mobile telecommunication network candidate to help radio base stations and/or cells of the mobile telecommunication network individuated as critical, selecting a subset of candidate radio base stations and/or cells of the mobile telecommunication network adapted to help corresponding critical radio base stations and/or cells of the mobile telecommunication network and modifying the radio operating parameters of radio base stations and/or cells of the mobile telecommunication network individuated as critical and of corresponding helping radio base stations and/or cells of the mobile telecommunication network with the aim to solve the traffic load criticality.

Preferably, according to different embodiments of the present invention methods operating at different periodicity are proposed. For example, in an embodiment of the present invention, a first time pattern is based on an analysis of traffic load counters collected in a month (e.g. twenty-eight days period) that are updated daily. Conversely, another embodiment of the present invention is based on an analysis of traffic load counters collected in a day (i.e., 24 hours period) and updated periodically during the day (e.g., at the expiry at time intervals having a predetermined duration).

Moreover, in an embodiment of the present invention it is avoided that multiple modifications of radio communication parameters of a same critical/candidate radio base stations and/or cells take place within a predetermined minimum time span.

Particularly, one aspect of the present invention proposes a method of balancing a traffic load among at least a part of traffic managing entities of a mobile telecommunication network comprising a plurality of traffic managing entities. The method comprises the following steps: collecting traffic-related data tfc referred to said at least a part of traffic managing entities; identifying a first set of traffic managing entities managing an excessive traffic load on the basis of such traffic-related data tfc; identifying a second set of traffic managing entities adapted to take charge of at least part of the excessive traffic load to which traffic managing entities of first set of traffic managing entities are subjected. Moreover, for each traffic managing entity of the first set of traffic managing entities the method comprises: determining at least one traffic managing entity of the second set of traffic managing entities adapted to take charge of at least part of the excessive traffic load managed by said traffic managing entity of the first set of traffic managing entities; assigning at least part of the excessive traffic load to which said traffic managing entity of first set of traffic managing entities is subjected to the determined at least one least one traffic managing entity of the second set of traffic managing entities, and adjusting radio communication parameters of said traffic managing entity of the first set of traffic managing entities and of said determined at least one traffic managing entity of the second set of traffic managing entities thereby redistributing traffic load on the basis of such assigning.

Preferred features of the present invention are set forth in the dependent claims.

In an embodiment of the present invention, step of collecting traffic-related data tfc referred to said at least a part of traffic managing entities comprises: either collecting traffic load counters from at least a part of traffic managing entities of a mobile telecommunication network, or collecting traffic load forecasts obtainable by means of mathematical models capable of providing an estimation of traffic load managed by the at least a part of traffic managing entities of a mobile telecommunication network.

In an embodiment of the present invention, the step of collecting traffic-related data tfc referred to said at least a part of traffic managing entities comprises: collecting at least one traffic-related datum of said traffic-related data tfc during each one of a plurality of predetermined observation time sub-periods uT comprised in an observation time period T.

In an embodiment of the present invention, collecting at least one traffic-related datum of said traffic-related data tfc during each one of a plurality of predetermined observation time sub-periods uT comprised in an observation time period T further comprises collecting a traffic-related datum tfc of the at least one of said traffic-related data tfc during a corresponding time interval dt, each predetermined observation time sub-period uT comprising at least one time interval dt.

In an embodiment of the present invention, the method further comprises, for each traffic managing entities of said at least a part of traffic managing entities, at least one among: determining a number $N_{uT}^{crit}$ of observation time sub-periods uT of said observation time period T during at least part of which the traffic managing entity manages an excessive traffic load on the basis of such traffic-related data tfc; determining a first number $N_{timeintv}^{crit,cons}$ of consecutive observation time sub-periods uT of said observation time period T during at least part of which the traffic managing entity manages an excessive traffic load on the basis of such traffic-related data tfc, determining a second number $N_{timeintv}^{non-crit,cons}$ of consecutive observation time sub-periods uT counted of said observation time period T during at least part of which the traffic managing entity does not manages an excessive traffic load on the basis of such traffic-related data tfc.

In an embodiment of the present invention, the method further comprising for each traffic managing entities of said at least a part of traffic managing entities determining an average number $\overline{N}_{timeint}^{crit}$ of time intervals dt of the observation time period T during which the traffic managing entity manages an excessive traffic load on the basis of such traffic-related data tfc.

In an embodiment of the present invention, determining an average number $N\overline{N}_{timeint}^{crit}$ of time intervals dt of the observation time period T during which the traffic managing entity manages an excessive traffic load on the basis of such traffic-related data tfc comprises averaging a total number of time intervals dt of the observation time period T during which the traffic managing entity manages an excessive traffic load by a number of observation time sub-periods uT of said observation time period T during at least part of which the traffic managing entity manages an excessive traffic load.

In an embodiment of the present invention, the step of determining a first number $N_{timeintv}^{crit,cons}$ of consecutive observation time sub-periods uT of said observation time period T during at least part of which the traffic managing entity manages an excessive traffic load on the basis of such traffic-related data tfc comprises counting the first number $N_{timeintv}^{crit,cons}$ of consecutive observation time sub-periods uT starting from a last observation sub-period of the observation period. Moreover, the step of determining a second number $N_{timeintv}^{non-crit,cons}$ of consecutive observation time sub-periods uT counted of said observation time period T during at least part of which the traffic managing entity does not manages an excessive traffic load on the basis of such traffic-related data tfc comprises: counting the second number $N_{timeintv}^{non-crit,cons}$ of consecutive observation time sub-periods uT starting from a last observation sub-period of the observation period.

In an embodiment of the present invention, the step of identifying a first set of traffic managing entities managing an excessive traffic load on the basis of such traffic-related data tfc comprises identifying a traffic managing entity as belonging to the first set of traffic managing entities whether it is verified at least one condition between: said number $N_{uT}^{crit}, N_{timeintv}^{crit,tot}$ of observation time sub-periods uT of said observation time period T during at least part of which a traffic managing entity manages an excessive traffic load is equal to, or greater than, a corresponding number threshold $N_{uT}^{thr,crit}$, $N_{timeintv}^{thr,crit,tot}$, and said first number $N_{timeintv}^{crit,cons}$ of consecutive observation time sub-periods uT of said observation time period T during at least part of which a traffic managing entity manages an excessive traffic load is equal to, or greater than, a corresponding consecutive number threshold $N_{timeintv}^{thr,crit,cons}$.

In an embodiment of the present invention, the step of identifying a first set of traffic managing entities managing an excessive traffic load on the basis of such traffic-related data tfc further comprises identifying a traffic managing entity as belonging to the first set of traffic managing entities whether said average number $\overline{N}_{timeint}^{crit}$ of time intervals dt of the observation time period T during which the traffic managing entity manages an excessive traffic load on the basis of such traffic-related data tfc is equal to, or greater than, a corresponding average number threshold $\overline{N}_{timeint}^{thr,crit}$.

In an embodiment of the present invention, the step of identifying a second set of traffic managing entities adapted to take charge of at least part of the excessive traffic load to which traffic managing entities of first set of traffic managing entities are subjected on the basis of such traffic-related data tfc comprises identifying a traffic managing entity as belonging to the second set of traffic managing entities whether it is verified at least one condition between: said number $N_{uT}^{crit}, N_{timeintv}^{crit,tot}$ of observation time sub-periods uT of said observation time period T for which the traffic managing entity does manage an excessive traffic load is lower than a corresponding further number threshold $N_{uT}^{thr,cand}$, $N_{timeintv}^{thr,cand,tot}$, and said second number $N_{timeintv}^{non-crit,cons}$ of consecutive observation time sub-periods uT of said observation time period T during at least part of which a traffic managing entity does not manage an excessive traffic load is equal to, or greater than, a corresponding further consecutive number threshold $N_{timeintv}^{thr,non-crit,cons}$.

In an embodiment of the present invention, the step of identifying a second set of traffic managing entities adapted to take charge of at least part of the excessive traffic load to which traffic managing entities of first set of traffic managing entities are subjected on the basis of such traffic-related data tfc further comprises identifying a traffic managing entity as belonging to the second set of traffic managing entities whether said average number $\overline{N}_{timeint}^{crit}$ of time intervals dt of the observation time period T during which the traffic managing entity manages an excessive traffic load on the basis of such traffic-related data tfc is lower than a corresponding further average number threshold $\overline{N}_{timeintv}^{thr,cand}$.

In an embodiment of the present invention, the step of determining at least one traffic managing entity of the second set of traffic managing entities adapted to take charge of at least part of the excessive traffic load managed by said traffic managing entity of the first set of traffic managing entities comprises selecting said at least one traffic managing entity of the second set of traffic managing entities on the basis of a proximity to said traffic managing entity of the first set of traffic managing entities.

In an embodiment of the present invention, collecting at least one of said traffic-related data tfc during each one of a plurality of predetermined observation time sub-periods uT comprised in an observation time period T further comprises collecting at least one of said traffic-related data tfc during consecutive predetermined observation time sub-periods uT, and considering as observation time period T a predefined number of observation time sub-periods uT by discarding an oldest observation time sub period of the predefined number of observation time sub periods whenever at least one of said traffic-related data tfc are collected in a newest observation time sub-period.

In an embodiment of the present invention, the step of determining at least one traffic managing entity of the second set of traffic managing entities adapted to take charge of at least part of the excessive traffic load managed by said traffic managing entities of the first set of traffic managing entities comprises evaluating an amount of excessive traffic load of each traffic managing entity of the first set of traffic managing entities, and determining at least one traffic managing entity of the second set of traffic managing entities adapted to take charge of at least part of the excessive traffic load of each traffic managing entity of the first set of traffic managing entities starting from a traffic managing entity of the first set of traffic managing entities associated with a greater amount of excessive traffic load.

In an embodiment of the present invention, the step of determining at least one traffic managing entity of the second set of traffic managing entities adapted to take charge of at least part of the excessive traffic load managed by said traffic managing entities of the first set of traffic managing entities comprises evaluating an amount of traffic load that may be took in charge by each traffic managing entity of the second set of traffic managing entities. Moreover said determined at least one traffic managing entity of the second set of traffic managing entities comprises two or more traffic managing entities of the second set of traffic managing entities, and the step of assigning at least part of the excessive traffic load to which said traffic managing entity of first set of traffic managing entities is subjected to the two or more traffic managing entities of the second set of traffic managing entities comprises adjusting radio communication parameters of said two or more traffic managing entities of the second set of traffic managing entities starting from a traffic managing entity of said two or more traffic managing entities of the second set of traffic managing entities which has been evaluated as able to take in charge a greatest amount of traffic load.

In an embodiment of the present invention, the step of identifying a first set of traffic managing entities managing an excessive traffic load on the basis of such traffic-related data tfc comprises for each traffic managing entities at least a part of traffic managing entities comprises determining a corresponding performance indicator $\overline{KPI}_{entity}^{i',j'}$, $KPI_{entity}$ referred to traffic-related data tfc in each time interval dt comprised in the observation time sub-periods uT of the observation time period T, and considering a traffic managing entities managing an excessive traffic load during a time interval dt whether the corresponding performance indicator trespasses a predetermined performance indicator threshold $KPI_{max}$.

In an embodiment of the present invention, determining a corresponding performance indicator referred to each time interval dt comprised in the observation time sub-periods uT of the observation time period T comprises determining a corresponding average performance indicator referred to each one of the time intervals dt by summing together all the performance indicator referred to corresponding time interval dt in different observation time sub-periods uT and dividing by a total number of observation time sub-period comprised in the observation time period T.

In an embodiment of the present invention, the method further comprises setting the observation time sub-period to a day and the observation time period T to at least a week. Moreover, determining a corresponding performance indicator referred to each time interval dt comprised in the observation time sub-periods uT of the observation time period T comprises determining a corresponding a first average performance indicator referred to each one of the time intervals dt associated with a time observation sub-period corresponding to a working day by summing together all the performance indicator referred to corresponding time interval dt in different observation time sub-periods uT corresponding only to working days and dividing by a total number of observation time sub-period corresponding only to working days comprised in the observation time period T set to at least one week, or determining a corresponding a second average performance indicator referred to each one of the time intervals dt associated with a time observation sub-period corresponding to a non-working day by summing together all the performance indicator referred to corresponding time interval dt in different observation time sub-periods uT corresponding only to non-working days and dividing by a total number of observation time sub-periods uT corresponding only to non-working days comprised in the observation time period T set to at least one week.

In an embodiment of the present invention, the method further comprises setting the observation time sub-period to a day and the observation time period T to at least two weeks. Moreover, determining a corresponding performance indicator referred to each time interval dt comprised in the observation time sub-periods uT of the observation time period T comprises determining a corresponding average performance indicator referred to each one of the time intervals dt associated with a time observation sub-period corresponding to a same day of a week by summing together all the performance indicator referred to corresponding time interval dt in different observation time sub-periods uT corresponding only to corresponding days of the at least two weeks and dividing by a total number of observation time sub-periods uT corresponding only to corresponding days of the time period set to at least two weeks.

In an embodiment of the present invention, the method further comprises setting the observation time sub-period equal to a time interval dt and the observation time equal to a day.

Another aspect of the present invention proposes a system for balancing a traffic load among at least a part of traffic managing entities of a mobile telecommunication network comprising a plurality of traffic managing entities. The system comprises: a monitoring element arranged for collecting traffic-related data tfc referred to said at least a part of traffic managing entities; a first operating element arranged for identifying a first set of traffic managing entities managing an excessive traffic load on the basis of such traffic-related data tfc; a second operating element arranged for identifying a second set of traffic managing entities adapted to take charge of at least part of the excessive traffic load to which traffic managing entities of first set of traffic managing entities are subjected; an engine element that, for each traffic managing entity of the first set of traffic managing entities, is arranged for: determining at least one traffic managing entity of the second set of traffic managing entities adapted to take charge of at least part of the excessive traffic load managed by said traffic managing entity of the first set of traffic managing entities; assigning at least part of the excessive traffic load to which said traffic managing entity of first set of traffic managing entities is subjected to the determined at least one least one traffic managing entity of the second set of traffic managing entities, and adjusting radio communication parameters of said traffic managing entity of the first set of traffic managing entities and of said determined at least one traffic managing entity of the second set of traffic managing entities.

The Applicant believes that a significant improvement in distribution of the traffic load in the mobile communication network and consequently global performances of the mobile communication network (e.g. voice and data call blocking probability, average throughput per user, average throughput per radio base station and/or cell, etc.) may be achieved by implementing the Mobility Load Balancing—MLB—methods and systems here proposed in the mobile telecommunication network, preferably (although not limitatively) a mobile telecommunication Self-Organising Network.

BRIEF DESCRIPTION OF THE DRAWINGS

These and other features and advantages of the present invention will more clearly appear by the reading of the following detailed description of exemplary and non-limitative embodiments thereof, description that, for its better intelligibility, should be read in conjunction to the attached drawings, wherein.

DETAILED DESCRIPTION OF EXEMPLARY EMBODIMENTS OF THE PRESENT INVENTION

One embodiment of the present invention concerns a Mobility Load Balancing, or MLB, method applied to 2G, 3G and Long Term Evolution (LTE)/Long Term Evolution-Advanced (LTE-A) or others mobile telecommunication networks with the aim to provide an optimised distribution of the traffic load in the mobile telecommunication network thus improving an overall performance thereof.

More generally, embodiments of the present invention are arranged for controlling and distributing, in real-time and in an optimal way, the traffic load in the mobile telecommunication network, e.g. between radio base stations and/or cells of a LTE/LTE-A, GSM/GPRS/EDGE or UMTS/HSPA mobile telecommunication networks and/or between different co-existing 2G and/or 3G and/or 4G or higher mobile telecommunication network systems.

In more details, a network planner/designer/optimiser by implementing the MLB methods according to the present invention is able to obtain real-time distributing (and re-distributing) of traffic load among radio base stations and/or cells of a mobile telecommunication network.

Preferably, in an embodiment of the present invention the method allows:
- evaluating a traffic load of each radio base stations and/or cells of a mobile telecommunication network through the use traffic-related data, preferably of traffic load counters, made available by the mobile telecommunication network in real-time (or semi real-time); for example, with a periodicity between fifteen and sixty minutes (even though also other periodicity may be taken into account without impact on the method);
- analysing and individuating 'critical' radio base stations and/or cells of the mobile telecommunication network managing an excessive traffic load on the basis of information obtained from traffic load counters; preferably, such analysing and individuating are performed by exploiting Key Performance Indicators KPI based on elaboration of the traffic load counters;
- analysing and identifying 'candidate' radio base stations and/or cells of the mobile telecommunication network that may be suited to manage a part of the traffic load of a corresponding critical radio base station and/or cell; preferably, the candidates radio base stations and/or cells are identified using KPI previously elaborated;
- selecting, for each critical radio base station and/or cell, a subset of the candidate radio base stations and/or cells of the mobile telecommunication network to which re-direct the traffic (or at least a part of the traffic) of the critical radio base station and/or cell, and
- modifying one or more radio communication parameters with the aim to re-direct the traffic (or at least part of the traffic) of the critical radio base station and/or cell towards the selected subset of candidate radio base stations and/or cells.

Figure 1:
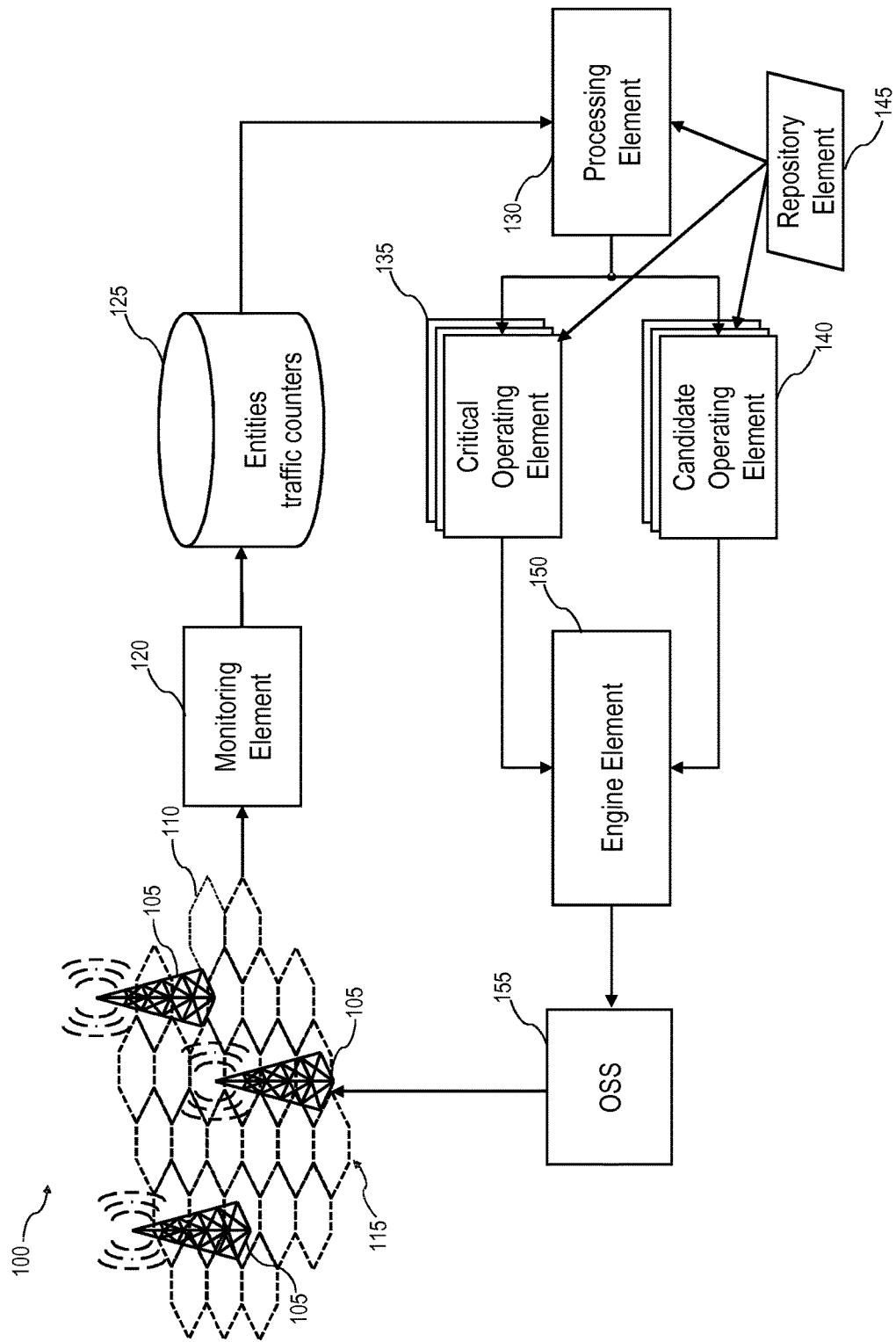
FIG. 1 is a schematic diagram a mobile telecommunication network in which embodiments of the present invention may be implemented.

With reference to the drawing, FIG. 1 is a schematic diagram a mobile telecommunication network 100 in which embodiments of the present invention may be implemented.

The mobile telecommunication network 100 comprises a plurality of Network Elements, such as radio base stations 105, e.g., evolved Node B, or eNB in Long Term Evolution (LTE)/Long Term Evolution-Advanced (LTE-A) mobile telecommunication networks. Each radio base station 105 is configured for managing communication of (i.e., for serving) User Equipment, or UE (not shown), comprised within respective one or more covered areas, and/or cells 110, in which a covered geographic area 115, in which the mobile telecommunication network 100 operates, is subdivided.

In one embodiment of the invention, the mobile telecommunication network 100 comprises a monitoring element 120 arranged to monitor performances of radio base stations 105 and/or cells 110, or a part of the radio base stations 105 and/or cells 110, comprised in the mobile telecommunication network 100.

The mobile telecommunication network 100 further comprises a storage element 125 capable of collecting and storing traffic-related data, such as for example 'traffic load counters' tfc related to the radio base stations 105 and/or cells 110 of the mobile telecommunication network 100.

According to 3GPP TS32.401, counters, or 'cumulative incremental counters' are triggered by the occurrence of a measured event (e.g., expiry of a predetermine time period) and each network element (e.g., a radio base station 105, a relay node etc.) maintains a running count of the event being counted. The counter is reset to a well-defined value (usually "0") at the beginning of a time interval or granularity period (wherein a granularity period corresponds to a frequency at which the measured events are counted; moreover, at the end of the each time interval a scheduled result report is usually generated and provided to managing network elements of the mobile telecommunication network 100).

The mobile telecommunication network 100 further comprises a processing element 130 that is arranged for processing the traffic-related data such as for example the aforementioned traffic load counters tfc, related to the radio base stations 105 and/or cells 110 of the mobile communication network 100. Preferably, the processing element 130 is configured to elaborate the traffic-related data in order to obtain one or more corresponding Key Performance indicators (KPI), as described in the following.

The mobile telecommunication network 100 further comprises operating elements 135 and 140 that are both arranged for elaborating the KPI provided by the processing element 130.

Preferably, a first operating element 135 of the operating elements 135 and 140 is configured for elaborating the KPI in order to identify a (first) set of 'critical' radio base stations 105 and/or cells 110 of the radio base stations 105 and/or cells 110 of the mobile telecommunication network 100. Critical radio base stations 105 and/or cells 110 is herein used to denote radio base stations 105 and/or cells 110 of the mobile telecommunication network 100 that result to be managing an excessive traffic load as determined by the methods according to embodiments of the present described in the following.

Conversely, a second operating element 140 of the operating elements 135 and 140 is configured for elaborating the KPI in order to identify a (second) set of 'candidate' radio base stations 105 and/or cells 110 of the set of radio base stations 105 and/or cells 110. Candidate radio base stations 105 and/or cells 110 is herein used to denote radio base stations 105 and/or cells 110 of the mobile telecommunication network 100 suited for taking charge of at least part of a traffic load of a critical radio base stations 105 and/or cells 110 (as described in the following). In other words candidate radio base stations 105 and/or cells 110 are capable of managing a traffic load greater than a traffic load currently managed on the basis of such traffic-related data.

As discussed in the following, the processing element 130 and the operating elements 135 and 140 may use a plurality of processing parameters, for performing their operation, such as (traffic load) threshold values. Such plurality of processing parameters may be advantageously stored in an ad-hoc repository element 145 or in the storage element 125 or even in other (e.g., general-purpose) storage elements (not shown) of the mobile telecommunication network 100.

The mobile telecommunication network 100 further comprises an engine element 150 that is arranged to redistribute traffic load among critical radio base stations 105 and/or cells 110 and candidate radio base stations 105 and/or cells 110 and to modify one or more radio communication parameters of the critical and candidate radio base stations 105 and/or cells 110 of the mobile telecommunication network 100 accordingly. Preferably, the engine element 150 is arranged to modify the Radio Access Network (RAN; i.e., a portion of the mobile telecommunication network 100 which manages the radio access technology used to provide communications with UE) of the critical and candidate radio base stations 105 and/or cells 110 of the mobile telecommunication network 100.

In addition, the engine element 150 is further arranged for providing to an Operational Support Systems (OSS) 155 (i.e., a computer system arranged for, at least partially, automatically managing the mobile telecommunication network 100) the modified values of the parameters in order to enable the OSS 155 to reconfigure the radio communication parameters of radio base stations 105 and/or cells 110 of the mobile telecommunication network 100 on the basis of such modified values.

In one embodiment of the present invention the processing element 130, the first operating element 135, the second operating element 140 and/or engine element 150 may be advantageously implemented as a single entity.

It should be appreciated that the structure of the mobile telecommunication network 100 may be implemented in any known manner; for example, the system 100 may comprise a plurality of network elements and/or one or more computing networks, either of physical type (e.g., with one or more dedicated machines implementing the monitoring element 120, storage element 125, the processing element 130, the operating elements 135 and 140, the repository 145, the engine element 150 and the OSS 155) or of virtual type (e.g., by implementing one or more virtual machines implementing the monitoring element 120, storage element 125, the processing element 130, the operating elements 135 and 140, the repository 145, the engine element 150 and the OSS 155 in a computing network).

Figure 2:
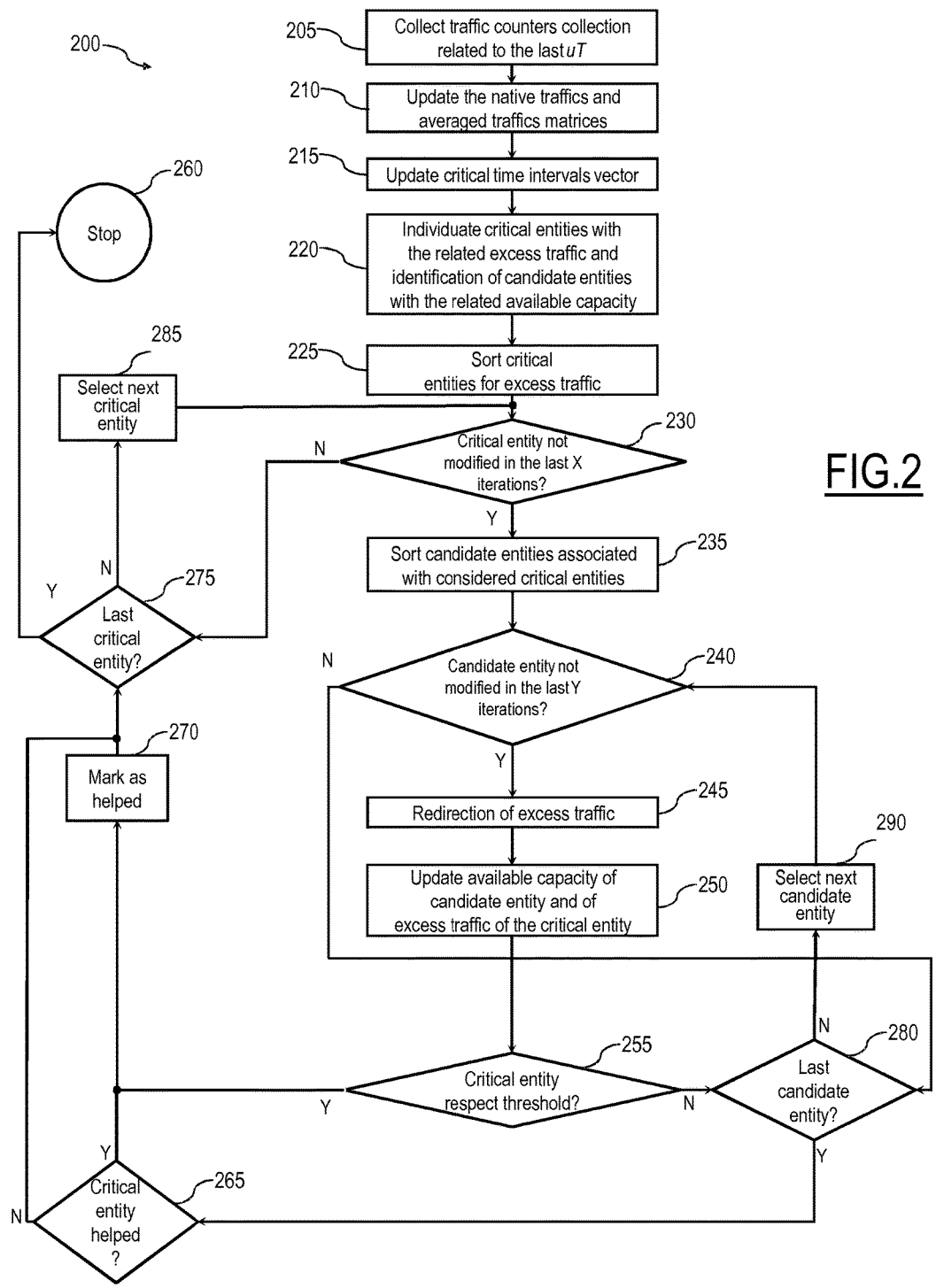
FIG. 2 is a schematic flow diagram of a MLB method according to an embodiment of the present invention.

Turning now to FIG. 2, it is a schematic flow diagram of a MLB method 200 according to an embodiment of the present invention.

The MLB method 200 according to the present invention is preferably arranged for supervising a (communication) traffic load managed by the radio base stations 105 and/or cells 110 of the mobile telecommunication network 100. It should be noted that the MLB method 200 according to the present invention may be configured for controlling all the radio base stations 105 and/or cells 110 of the mobile telecommunication network 100 or only a part thereof.

Preferably, the MLB method 200 is based on an analysis of traffic load counters tfc collected over an observation period T of, for example, one month (e.g., considered as a period of 28 days), which are preferably updated at each observation sub-period uT having a higher periodicity, e.g. daily.

Initially (block 205), a traffic load counters update is performed. Traffic load counters tfc of the last observation sub-period uT, e.g. the last day, and related to the radio base stations 105 and/or cells 110 to be managed by MLB method 200, are collected.

Preferably, the monitoring element 120 collects and stores in the storage element 125 a plurality of traffic load counters tfc during each observation sub-period uT on a per radio base station 105 and/or cell 110 basis. For example, each observation sub-period uT comprises a plurality of time intervals dt (e.g., each 15 to 60 minutes long, i.e. 24 to 96 time interval dt are comprised in a 24 hours long observation sub-period uT) and a traffic load counter tfc is collected during each time interval dt for each radio base station 105 and/or cell 110 of the radio base stations 105 and/or cells 110.

In one embodiment of the present invention, the traffic load counters tfc comprise an information regarding a carried (data) traffic (for example measured in Erlang) Carried_Data_Erlang$_{entity}$, or CDE$_{entity}$, where the term "entity" is herein used to denote a considered traffic managing entity, i.e. the considered radio base station 105 and/or cell 110) carried by each radio base station 105 and/or cell 110 of the radio base stations 105 and/or cells 110.

In one embodiment of the present invention, the CDE$_{entity}$ may be directly exploited as KPI in order to determine critical and/or candidate radio base stations 105 and/or cells 110, i.e.:

$$\text{KPI}_{entity} = \text{CDE}_{entity}, \tag{1}$$

wherein KPI$_{entity}$ is the KPI referred to the radio base station 105 and/or cell 110 associated with the CDE$_{entity}$.

It should be noted that also other types of KPI (eventually expressed as a function of different counters provided in the mobile telecommunication network 100) may be considered in order to optimise the traffic load of the entities (i.e., radio base station 105 and/or cell 110) of the mobile telecommunication network 100 managed by the MLB method 200.

For example, in a LTE/LTE-A mobile telecommunication networks a data block (or blocking) probability could be exploited as KPI; in a 3G mobile telecommunication networks occupied spreading codes could be exploited as KPI, and in both 2G and 3G mobile telecommunication networks a data and voice block (or blocking) probability could be exploited as KPI. Subsequently (block 210), 'native' traffic load counters matrices are generated or updated on a per radio base stations 105 and/or cells 110 basis. Preferably, a native traffics counter vector, referred to a last observation sub-period uT, comprising traffic load counters collected on per radio base stations 105 and/or cells 110 is inserted into the corresponding native traffic load counters matrices while a first vector thereof is discarded (i.e., whenever a new native traffics counter vector is added to the native traffic load counters matrix an oldest traffic counter vector is removed therefrom). In other words, the observation period T defines a wideness of an observation window which is shifted at a pace corresponding to an observation sub-period uT.).

Figure 3:
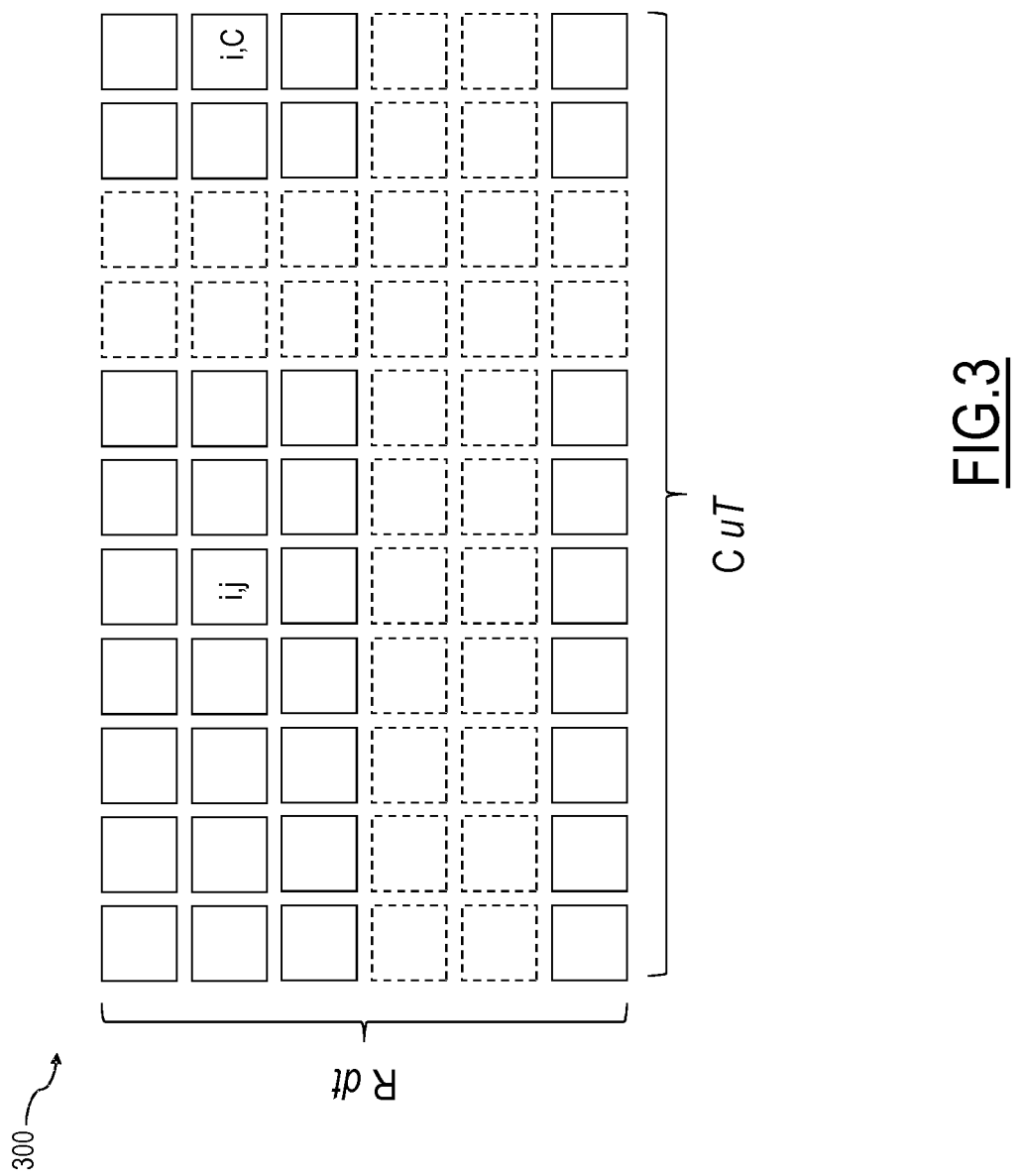
FIG. 3 is a schematic representation of a native traffic load counters matrix referred to a radio base station and/or cell of the mobile telecommunication network.

As schematically shown in FIG. 3, a native traffic load counters matrix 300 referred to a radio base station 105 and/or cell 110 comprises C columns, one for each observation sub-period uT, e.g. a day, thus C=28 in the example of FIG. 2, of the observation period T, and R rows, one for each KPI obtained from a corresponding traffic load counter tfc (i.e., collected in a corresponding time interval dt, thus R=24 to 96 in the example of FIG. 2) in an observation sub-period uT of the observation period T. In other words, each generic element i,j of the native traffic load counters matrix 300 corresponds to a traffic load counter tfc associated with the radio base station 105 and/or cell 110 to which the native traffic load counters matrix 300 is referred.

In addition, also averaged traffic load counters matrices are generated or updated on a per radio base stations 105 and/or cells 110 basis. Averaged traffic load counters matrices are built starting from native traffic load counters matrices.

Figure 4:
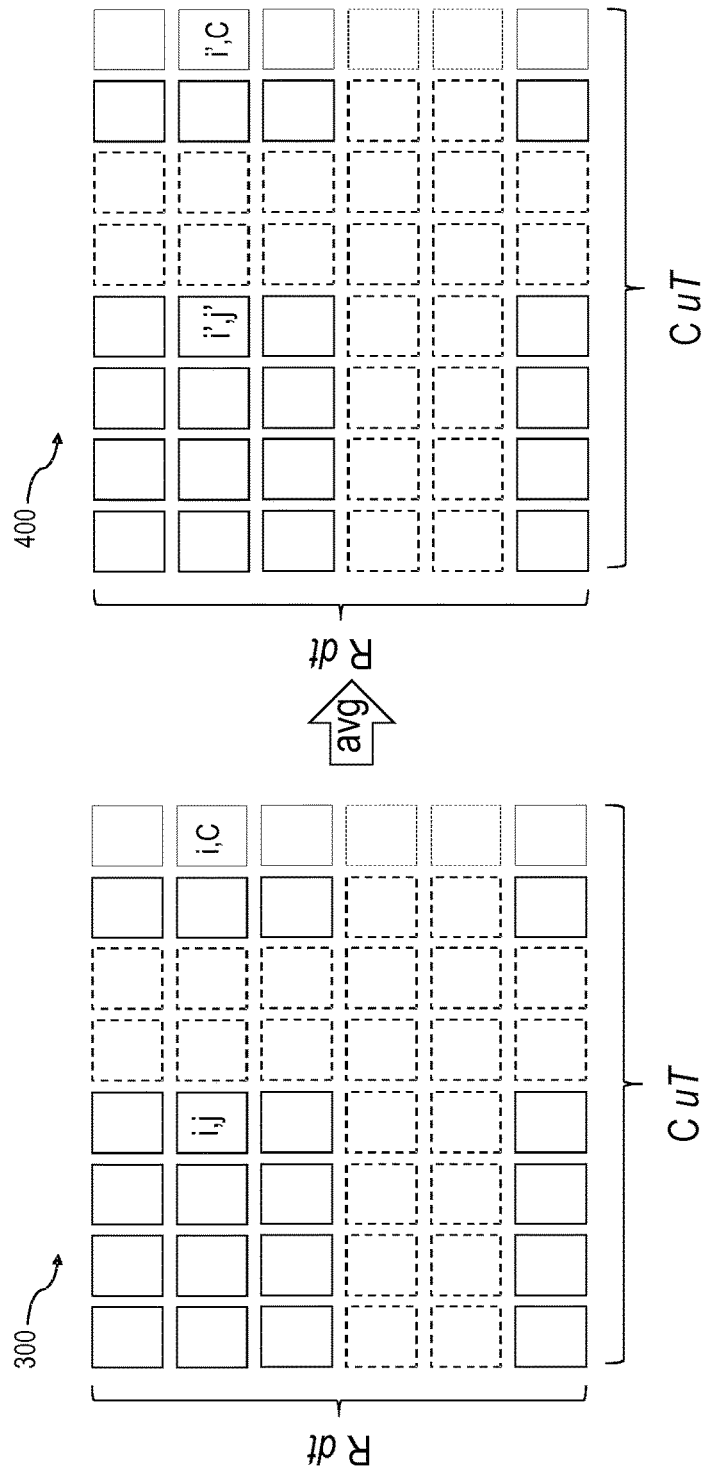
FIG. 4 is a schematic representation of an averaged traffic load counters matrix based on native traffic load counters matrix of FIG. 3.

For example, as schematically shown in FIG. 4, a generic element i',C of an averaged traffic load counters matrix 400 related to, e.g., of the last observation sub-period uT just added to the native traffic load counters matrix 300 (e.g., the last day—in the Cth position in the column of the traffic load counters matrix 400—of the twenty-eight days of the one-month observation period T considered in the example of FIG. 2) may be preferably, although not limitatively, calculated by exploiting one the following formula:

$$\overline{KPI}_{entity}^{i',C} = \frac{1}{N} \cdot \sum_{j'=C-N+1}^{C} KPI_{entity}^{i,j}, \quad (1)$$

where N is an integer number selected between 2 and C (i.e., 2≤N≤C). In other words, the generic element i',C of an averaged traffic load counters matrix 400 is the average of a desired number N of elements on the same row i starting from the last element (i.e., element i, C) of the native traffic load counters matrix 300.

More preferably, in the example of FIG. 2, in order to taking into account different traffic load condition during working days and non-working days the generic element i',C of an averaged traffic load counters matrix 400 may be calculated by exploiting one of the two following formulas:

$$\overline{KPI}_{entity}^{i',C} = \frac{1}{N'} \cdot \sum_{j'}^{mon-fri} KPI_{entity}^{i,j}, \quad (2)$$

where N' is an integer number selected between 2 and 20 (i.e., 2≤N'≤20), if the last observation sub-period uT corresponds to a working day of the twenty-eight days observation period T (i.e. 20 weekdays are considered in the example of FIG. 2 corresponding to days from Monday to Friday in each one of the four weeks of the one-month observation period T), or $$\overline{KPI}_{entity}^{i',C} = \frac{1}{N''} \cdot \sum_{j'}^{sat-sun} KPI_{entity}^{i,j}, \quad (3)$$

where N" is an integer number selected between 2 and 8 (i.e., 2≤N"≤8), if the last observation sub-period uT corresponds to a non-working day of the twenty-eight days observation period T (i.e., 8 non-working days are considered in the example of FIG. 2 corresponding to Saturdays and Sundays in each one of the four weeks of the one-month observation period T).

Alternatively, the generic element of the averaged traffic load counters matrix 400 related to a generic last observation sub-period uT may be calculated by exploiting the following formula:

$$\overline{KPI}_{entity}^{i',C} = \frac{1}{N'''} \cdot \sum_{j'}^{day1-7} KPI_{entity}^{i,j}, \quad (4)$$

where N' is an integer number selected between 2 and 4 (i.e., 2≤N'''≤4), wherein day 1-7 indicates the same day (e.g., Mondays) of each week of the four week comprised in the twenty-eight days observation period T in the example of FIG. 2.

Starting from each averaged traffic load counters matrix 400 just computed, a corresponding critical time intervals vector 500 is built (thus, again on a per radio base station 105 and/or cell 110 basis; block 215).

A 'critical' time interval cdt is herein defined as a time interval dt during which a radio base station 105 and/or cell 110 of the radio base stations 105 and/or cells 110 is subjected to a excessive traffic load.

In one embodiment of the invention, a radio base station 105 and/or cell 110 is considered to be subjected to an excessive traffic load during a time interval dt (i.e., a critical time interval cdt) whether the $\overline{KPI}_{entity}^{i',j'}$ referred to the time interval dt exceed a corresponding maximum value $KPI_{max}$:

$$\overline{KPI}_{entity}^{i',j'} > KPI_{max}, \text{ or} \quad (5)$$

$$\overline{KPI}_{entity}^{i',j'} > KPI_{max} = CDE_{max}, \quad (5bis)$$

in case $CDE_{entity}$ are directly exploited as KPI. It should be noted that a generic $KPI_{max}$ could be exploited for all the radio base stations 105 and/or cells 110 of the mobile telecommunication networks 100. Alternatively, different $KPI_{max}$ may be associated with typical environments where the radio base stations 105 and/or cells 110 of the mobile telecommunication networks 100 may be deployed, e.g. different $KPI_{max}$ may be defined for "dense urban", "urban", "suburban" o "rural" environment types. As a further alternative, in embodiment of the present invention respective $KPI_{max}$ could be selected for each one of the radio base stations 105 and/or cells 110 of the mobile telecommunication networks 100 according to corresponding implementing hardware/physical location etc.

Figure 5:
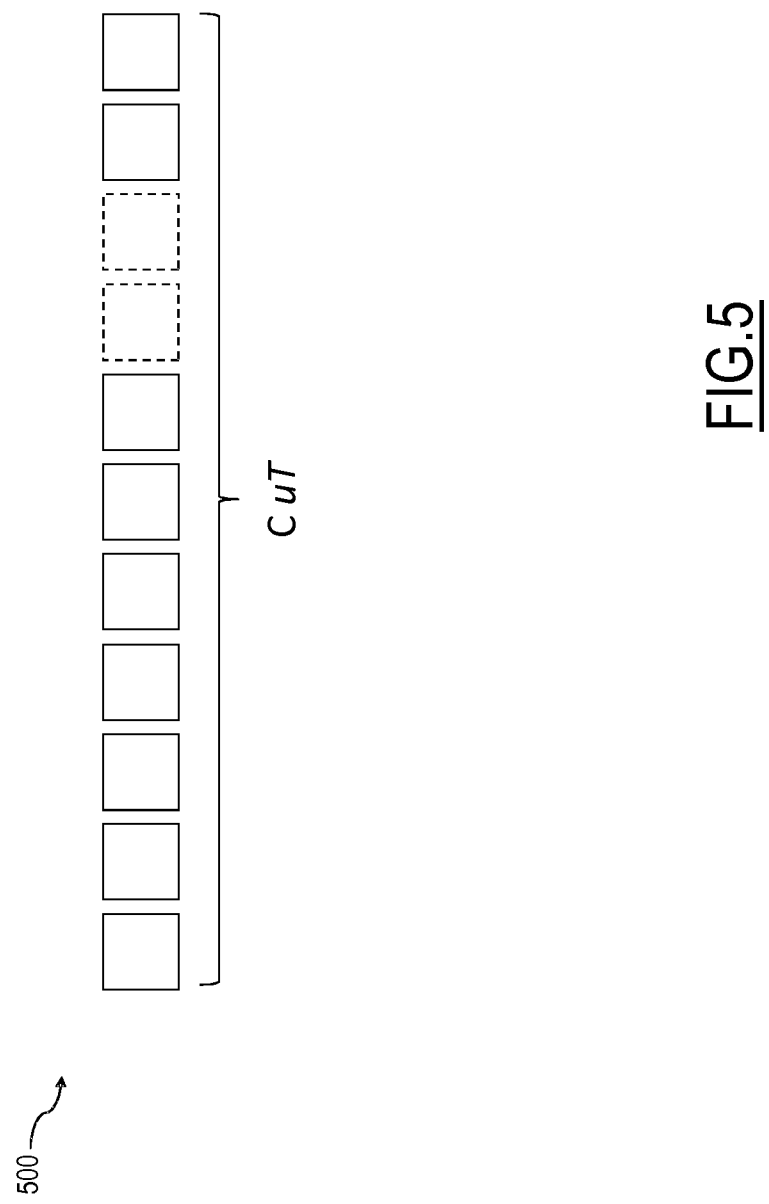
FIG. 5 is a schematic representation of a critical time intervals vector based on the averaged traffic load counter matrix of FIG. 4.

As schematically shown in FIG. 5, the critical time intervals vector 500 comprises an element indicating a number of critical time intervals cdt identified during each observation sub-period uT, i.e. a day in the example of FIG. 2, of the observation period T, the observation period T being a month in the example of FIG. 2. Therefore, the critical time intervals vector 500 is a single row comprising C elements (one for each one of the C columns, or observation sub-period uT, of the corresponding averaged traffic load counters matrix 400).

Through the critical time intervals vector 500, for each radio base station 105 and/or cell 110 are identified (block 220, e.g. by the processing element 130):

a number $N_{uT}^{crit}$ of observation sub-periods uT (e.g., days in the example of FIG. 2) comprising one or more critical time intervals cdt in the observation period T;

an average number $\overline{N}_{timeint}^{crit}$ of critical time intervals cdt evaluated by averaging a total number of critical time intervals cdt identified in the averaged traffic load counters matrix 400 by a number of observation sub-periods uT (e.g., days in the example of FIG. 2) of the observation period T comprising one or more critical time intervals cdt.

The number of observation sub-periods $N_{uT}^{crit}$ and the average number of critical time intervals $\overline{N}_{timeint}^{crit}$ are exploited for evaluating which radio base stations 105 and/or cells 110 of the selected radio base stations 105 and/or cells 110 are critical.

In one embodiment of the invention, a generic radio base station 105 and/or cell 110 is identified (e.g., by the first operating element 135) as a critical radio base stations 105 and/or cells 110 whether it satisfies at least one of the following conditions:

$$N_{uT}^{crit} \geq N_{uT}^{thr,crit}, \quad (6)$$

where $N_{uT}^{thr,crit}$ is a critical observation sub-periods threshold (e.g., stored in the repository element 145) indicating a minimum number of observation sub-periods uT within the observation period T (i.e., days within the twenty-eight days in the example of FIG. 2) comprising one or more critical time intervals cdt above which the generic radio base station 105 and/or cell 110 is to be considered a critical radio base station 105 and/or cell 110, and/or $$\overline{N}_{timeint}^{crit} \geq \overline{N}_{timeintv}^{thr,crit}, \quad (7)$$

where $\overline{N}_{timintv}^{thr,crit}$ is an average critical time interval threshold (e.g., stored in the repository element 145) indicating a minimum value of an average number of critical time intervals cdt within observation sub-periods uT in which at least one critical time intervals cdt has been identified above which the generic radio base station 105 and/or cell 110 is to be considered a critical radio base station 105 and/or cell 110.

It should be noted that a 'sensitivity to criticality' of the MLB method 200 may be adjusted by selecting as a criterion for identifying as critical the radio base stations 105 and/or cells 110 one among the following: verifying only a selected one between condition (6) and (7), verifying one between condition (6) and (7) (i.e., a Boolean logic OR operation), or verifying both condition (6) and (7) (i.e., a Boolean logic AND operation). Indeed, an there is a higher probability (higher sensitivity) that a radio base station 105 and/or cell 110 would be selected as critical by applying a Boolean logic OR operation between conditions (6) and (7), while there is a lower probability (lower sensitivity) that a radio base station 105 and/or cell 110 would be selected as critical by applying a Boolean logic AND operation between conditions (6) and (7), with an 'intermediate' probability that a radio base station 105 and/or cell 110 would be selected as critical by applying only a selected one between conditions (6) and (7). In other words a greater number of radio base stations 105 and/or cells 110 would be considered critical by applying the Boolean logic OR operation between conditions (6) and (7) rather than by applying the Boolean logic AND operation between conditions (6) and (7).

Both the critical observation sub-periods threshold $N_{uT}^{thr,crit}$ and the average critical time interval threshold $\overline{N}_{timeintv}^{crit}$ are preferably defined empirically on the basis of the impact on the operation of the mobile communication network 100. Even more preferably, the critical observation sub-periods threshold $N_{uT}^{thr,crit}$ and the average critical time interval threshold $\overline{N}_{timeintv}^{thr,crit}$ are defined on the basis of a criterion that tries to limit the number of modification operations to be performed by the MLB method 200 on the radio communication parameters of radio base stations 105 and/or cells 110 of the mobile telecommunication network 100 (e.g., in order to contain a workload of the mobile telecommunication network 100, due to modification operations, below a desired level).

Conversely, if the number of observation sub-periods $N_{uT}^{crit}$ and the average number of critical time intervals $\overline{N}_{timeint}^{crit}$ associated with the generic radio base station 105 and/or cell 110 does not satisfy condition (6) or/and (7), it may be identified (e.g., by the second operating element 140) as a candidate radio base station 105 and/or cell 110 whether it satisfies at least one of the following conditions:

$$N_{uT}^{crit} < N_{uT}^{thr,cand}, \quad (8)$$

where $N_{uT}^{thr,cand}$ is a candidate observation sub-periods threshold (e.g., advantageously stored in the repository element 145) indicating the maximum number of observation sub-period uT within the observation period T (days within the twenty-eight days in the example of FIG. 2) comprising by one or more critical time intervals cdt below which the generic radio base station 105 and/or cell 110 is considered to be a possible candidate critical radio base station 105 and/or cell 110, and/or $$\overline{N}_{timeint}^{crit} < \overline{N}_{timeintv}^{thr,cand}, \quad (9)$$

where $\overline{N}_{timeintv}^{thr,cand}$ is a candidate average time interval threshold (e.g., advantageously stored in the repository element 145) indicating the maximum value of the average number of daily critical time intervals cdt within observation sub-periods uT in which at least one critical time interval cdt has been identified below which the generic radio base station 105 and/or cell 110 is to be considered a possible candidate critical radio base station 105 and/or cell 110.

It should be noted that a 'sensitivity to candidability' of the MLB method 200 may be adjusted by selecting a criterion for identifying as candidate the radio base stations 105 and/or cells 110 one among the following: verifying only a selected one between condition (8) and (9), verifying one between condition (8) and (9) (i.e., a Boolean logic OR operation), or verifying both condition (8) and (9) (i.e., a Boolean logic AND operation). Indeed, an there is a higher probability (higher sensitivity) that a radio base station 105 and/or cell 110 would be selected as candidate by applying a Boolean logic OR operation between conditions (8) and (9), while there is a lower probability (lower sensitivity) that a radio base station 105 and/or cell 110 would be selected as candidate by applying a Boolean logic AND operation between conditions (8) and (9), with an 'intermediate' probability that a radio base station 105 and/or cell 110 would be selected as candidate by applying only a selected one between conditions (8) and (9). In other words a greater number of radio base stations 105 and/or cells 110 would be considered candidate by applying the Boolean logic OR operation between conditions (8) and (9) rather than by applying the Boolean logic AND operation between conditions (8) and (9).

Both the candidate observation sub-periods threshold $N_{uT}^{thr,cand}$ and the candidate average time interval threshold $\overline{N}_{timeintv}^{thr,cand}$ are preferably defined empirically on the basis of the impact on the operation of the mobile communication network 100 as previously considered with respect to the the critical observation sub-periods threshold $N_{uT}^{thr,crit}$ and the average critical time interval threshold $\overline{N}_{timeintv}^{thr,crit}$.

For each radio base station 105 and/or cell 110 of the radio base stations 105 and/or cells 110 identified as critical (e.g., by the first operating element 135) an excess portion $KPI_{entity}^{exc}$ of the value of the corresponding KPI with respect a corresponding maximum KPI value is determined.

Preferably, the excess portion $KPI_{entity}^{exc}$ is calculated according to one of the following alternatives:

$$KPI_{entity}^{exc} = KPI_{timeintv}^{max,crit} - KPI_{max}, \quad (10)$$

where $KPI_{entity}^{max,crit}$ is an actual maximum KPI value (e.g., advantageously stored in the repository element 145) individuated considering the elements of the averaged traffic load counters matrix 400 associated with critical time intervals cdt, or $$KPI_{entity}^{exc} = KPI_{timeintv}^{avg,crit} - KPI_{max}, \quad (11)$$

where $KPI_{timeintv}^{avg,crit}$ is an averaged KPI estimated considering the elements of the averaged traffic load counters matrix 400 associated with critical time intervals cdt.

Conversely, for each radio base station 105 and/or cell 110 of the radio base stations 105 and/or cells 110 identified as candidate (e.g., by the second operating element 140) may be identified a generic KPI availability $KPI_{entity}^{avlb,\ timeintv}$ for a generic time interval dt, i.e. accounting for resources available at the candidate radio base station 105 and/or cell 110 to be occupied/used by at least a part of the traffic load of the critical radio base stations 105 and/or cells 110.

Preferably, the generic KPI availability $KPI_{entity}^{avlb,timeintv}$ in the generic time interval dt is expressed by the relation:

$$KPI_{entity}^{avlb,timeintv} = \max(0, KPI_{max} - KPI_{entity}^{timeintv}), \quad (12)$$

where $KPI_{entity}^{timeintv}$ is the value of the KPI of the candidate radio base station 105 and/or cell 110 during the considered generic time interval dt.

Even more preferably, a KPI availability $KPI_{entity}^{avlb}$ associated with the candidate radio base station 105 and/or cell 110 is calculated. Preferably, the KPI availability $KPI_{entity}^{avlb}$ associated with the candidate radio base station 105 and/or cell 110 is calculated according to one of the following alternatives:

$$KPI_{entity}^{avlb} = KPI_{max} - KPI_{timeintv}^{max,noncrit}, \quad (13)$$

where $KPI_{timeintv}^{max,\ nonc}$ is a maximum KPI value among the elements of the averaged traffic load counters matrix 400 associated with non-critical time intervals dt, or $$KPI_{entity}^{avlb} = KPI_{max} - KPI_{timeintv}^{avg,nonc}, \quad (14)$$

where $KPI_{timeintv}^{avg,nonc}$ is an averaged available KPI value estimated on the basis of the averaged traffic load counters matrix 400 associated with non-critical time intervals dt.

In summary, a (first) set of critical radio base stations 105 and/or cells 110 and a (second) set of candidate radio base stations 105 and/or cells 110 are determined at block 220.

After the individuation of the set of critical radio base stations 105 and/or cells 110 and of the set of candidate radio base stations 105 and/or cells 110, critical radio base stations 105 and/or cells 110 are sorted in a critical entities list crit_List (block 225) on the basis of the value of the excess portion $KPI_{entity}^{exc}$.

For example, critical radio base stations 105 and/or cells 110 are listed in a descending order according to the value of the respective excess portions $KPI_{entity}^{exc}$. In other words, critical radio base stations 105 and/or cells 110 are listed from a 'most' critical radio base station 105 and/or cell 110, i.e. having the highest value of the respective excess portions $KPI_{entity}^{exc}$, to a 'least' critical radio base station 105 and/or cell 110, i.e. having the lowest value of the respective excess portions $KPI_{entity}^{exc}$.

In this way, critical radio base stations 105 and/or cells 110 are listed starting from the critical radio base station 105 and/or cell 110 experiencing most traffic load above its managing capacity among the critical radio base stations 105 and/or cells 110.

Preferably (block 230), starting from the first critical radio base station 105 and/or cell 110 of the critical entities list crit_List it is verified whether radio communication parameters of the critical radio base stations 105 and/or cells 110 have not been modified in the last X (e.g., 1≤X≤10) iterations of the MLB method 200.

The number X of consecutive iterations is preferably set on the basis of a desired 'aggressiveness' of the MLB method 200; i.e., the lower the number X the more modifications to the radio communication parameters of the critical radio base stations 105 and/or cells 110 are allowed and vice-versa, the greater the number X the less modifications to the radio communication parameters of the critical radio base stations 105 and/or cells 110 are allowed.

Advantageously, the number X of consecutive iterations for which radio communication parameters of the critical radio base station 105 and/or cell 110 have not changed, is (generally empirically) selected in order to avoid an excessive number of subsequent changes in radio communication parameters of a same critical radio base station 105 and/or cell 110 when no positive effects are obtained.

In the negative case (exit branch N of decision block 230), the radio communication parameters of the current radio base station 105 and/or cells 110 has been recently (i.e., within the last X iterations of the MLB method 200) modified and cannot be currently modified again; therefore the MLB method 200 proceeds to block 275 described in the following.

In the affirmative case (exit branch Y of decision block 230), is defined a subset of candidate radio base stations 105 and/or cells 110, or candidates subset, of the set of candidate radio base stations 105 and/or cells 110 identified at block 220 adapted to take charge of at least part of the excess of traffic load to which the current critical radio base station 105 and/or cell 110 is subjected.

Preferably, although not limitatively, candidate radio base stations 105 and/or cells 110 of the candidates subset are individuated among all the candidate radio base stations 105 and/or cells 110 of the set of candidate on the basis of proximity criteria; e.g., candidate radio base stations 105 and/or cells 110 located in substantially adjacent positions (i.e., neighbouring candidate radio base stations 105 and/or cells 110 located) to the considered critical radio base stations 105 and/or cells 110 under analysis.

The candidate radio base stations 105 and/or cells 110 of the candidates subset for a considered critical radio base station 105 and or cell 110 are then sorted in a list cand_List (block 235) on the basis of the value of the KPI availability $KPI_{entity}^{avlb}$.

For example, the candidate radio base stations 105 and/or cells 110 of the candidates subset are listed in a descending order according to a value of the KPI availability $KPI_{entity}^{avlb}$. In other words, candidate radio base stations 105 and/or cells 110 of the candidates subset are listed from a candidate radio base station 105 and/or cell 110 capable of taking charge a highest amount of traffic load (i.e. having the highest KPI availability $KPI_{entity}^{avlb}$) to a base station 105 and/or cell 110 capable of taking charge a smallest amount of traffic load (i.e. having the lowest KPI availability $KPI_{entity}^{avlb}$).

Sorting the candidate radio base stations 105 and/or cells 110 of the candidates subset in a descending order allow limiting a number of candidate radio base stations 105 and/or cells 110 exploited in order to redistributing the excessive traffic load of the considered critical radio base station 105 and/or cell 110.

Preferably (block 240), starting from the first candidate radio base station 105 and/or cell 110 of the candidate entities list cand_List it is verified whether radio communication parameters of the candidate radio base stations 105 and/or cells 110 have not been modified in the last Y (e.g., 1≤Y≤10; possibly Y=X) iterations of the MLB method 200.

In the negative case (exit branch N of decision block 240), the radio communication parameters of the current candidate radio base stations 105 and/or cells 110 of the candidate entities list cand_List have been recently (i.e., within the last Y iterations of the MLB method 200) modified and cannot be currently modified again; therefore, the considered critical radio base station 105 and/or cell 110 cannot be helped by the current candidate radio base station or cell in managing the excessive traffic load and MLB method 200 proceeds at block 280 described in the following.

In the affirmative case (exit branch Y of decision block 240), radio communication parameters of the considered critical radio base station 105 and/or cell 110 and of the candidate radio base station 105 and/or cell 110 are modified (block 245; by the engine element 150 and routed to the OSS 155) in such a way that the latter takes charge of at least part of the traffic load of the former. In other words, at least a part of the traffic load is redirected from the considered critical radio base station 105 and/or cell 110 to the selected candidate radio base station 105 and/or cell 110.

Subsequently (block 250), the excess portion $KPI_{crit,entity}^{exc}$ of the considered critical radio base station 105 and/or cell 110 and the KPI availability $KPI_{cand,entity}^{avlb}$ of the candidate radio base station 105 and/or cell 110 are updated for taking into account the just performed changes in the respective radio communication parameters:

$$KPI_{crit,entity}^{exc,upd} = \max(0, KPI_{crit,entity}^{exc} - KPI_{cand,entity}^{avlb}), \text{ and} \quad (15)$$

$$KPI_{cand,entity}^{avlb,upd} = \max(0, KPI_{cand,entity}^{avlb} - KPI_{crit,entity}^{exc}). \quad (16)$$

The updated excess portion value $KPI_{crit,entity}^{exc,upd}$ is analyzed in order to determine (decision block 255) whether the excessive traffic load of the critical radio base station 105 and/or cell 110 has been completely redistributed.

Preferably, it is checked whether the updated excess portion value $KPI_{crit,entity}^{exc,upd}$ is equal to zero ($KPI_{crit,entity}^{exc,upd}=0$).

In the affirmative case (exit branch Y of decision block 255), the updated excess portion value $KPI_{crit,entity}^{exc,upd}$ is equal to zero, all the excess traffic load of the considered critical radio base station 105 and/or cell 110 has been completely redistributed in the mobile telecommunication network 100; thus, the considered critical radio base station 105 and/or cell 110 is considered 'helped' and is removed (block 270) from the critical entities list crit_List and operation proceeds to decision block 275 described in the following.

In the negative case (exit branch N of decision block 255), the updated excess portion value $KPI_{crit,entity}^{exc,upd}$ is different from zero, i.e. the excessive traffic load to which the considered critical radio base station 105 and/or cell 110 has not yet been completely redistributed in the mobile telecommunication network 100, it is checked (decision block 280) whether the end of the candidate entities list cand_List has been reached or not (i.e., whether the candidate radio base station 105 and/or cell 110 just used for assisting the considered critical radio base station 105 and/or cell 110 was the last in the candidate entities list cand_List).

In the negative case (exit branch N of decision block 280), the end of the candidate entities list cand_List has not been reached, it is taken into account (block 290) the next candidate radio base station or cell and the operation returns to decision block 240.

In the affirmative case (exit branch Y of decision block 280), the end of the candidate entities list cand_List has been reached, and operation proceeds at decision block 265 where it is checked whether traffic load of the considered critical radio base station 105 and/or cell 110 has been at least partially reduced.

In the negative case (exit branch N of decision block 265), no candidate radio base stations 105 and/or cells 110 adapted to take charge of at least part of the traffic load of the considered critical radio base station 105 and/or cell 110 has been found and operation proceeds at block 275 described in the following.

In the affirmative case (exit branch Y of decision block 265), at least part of the traffic load of the considered critical radio base station 105 and/or cell 110 has been redistributed to candidate radio base stations 105 and/or cells 110, thus the considered critical radio base station 105 and/or cell 110 is considered 'partially helped' and is removed (block 270) from the critical entities list crit_List and operation proceeds to decision block 275.

At decision block 275 it is checked whether the end of the critical entities list crit_List has been reached or not (i.e., whether the critical radio base station 105 and/or cell 110 just considered was the last critical radio base station 105 and/or cell 110 in the critical entities list crit_List).

In the negative case (exit branch N of decision block 275), the end of the critical entities list crit_List has not been reached, it is taken into account (block 285) the next critical radio base station or cell and the operation returns to decision block 230 for selecting a next critical radio base station 105 and/or cell 110 from the critical entities list crit_List.

In the affirmative case (exit branch Y of decision block 275), the end of the critical entities list crit_List has been reached, thus the MLB method 200 stops (block 260) the current iteration (i.e. the iteration subsequent to the acquisition of traffic load counters ctf referred to the last observation sub-period uT).

It should be noted that the MLB method 200 is preferably iterated with a frequency corresponding to the observation sub-period uT; i.e. daily.

Thanks to the MLB method 200 just described it is possible to effectively redistribute excessive traffic load suffered by a radio base station 105 and/or cell 110 of the mobile telecommunication network 100 to other adequate radio base stations 105 and/or cells 110 (i.e., candidate radio base stations 105 and/or cells 110 of the candidates subset) of the mobile telecommunication network 100 in a completely automatic manner.

Figure 6:
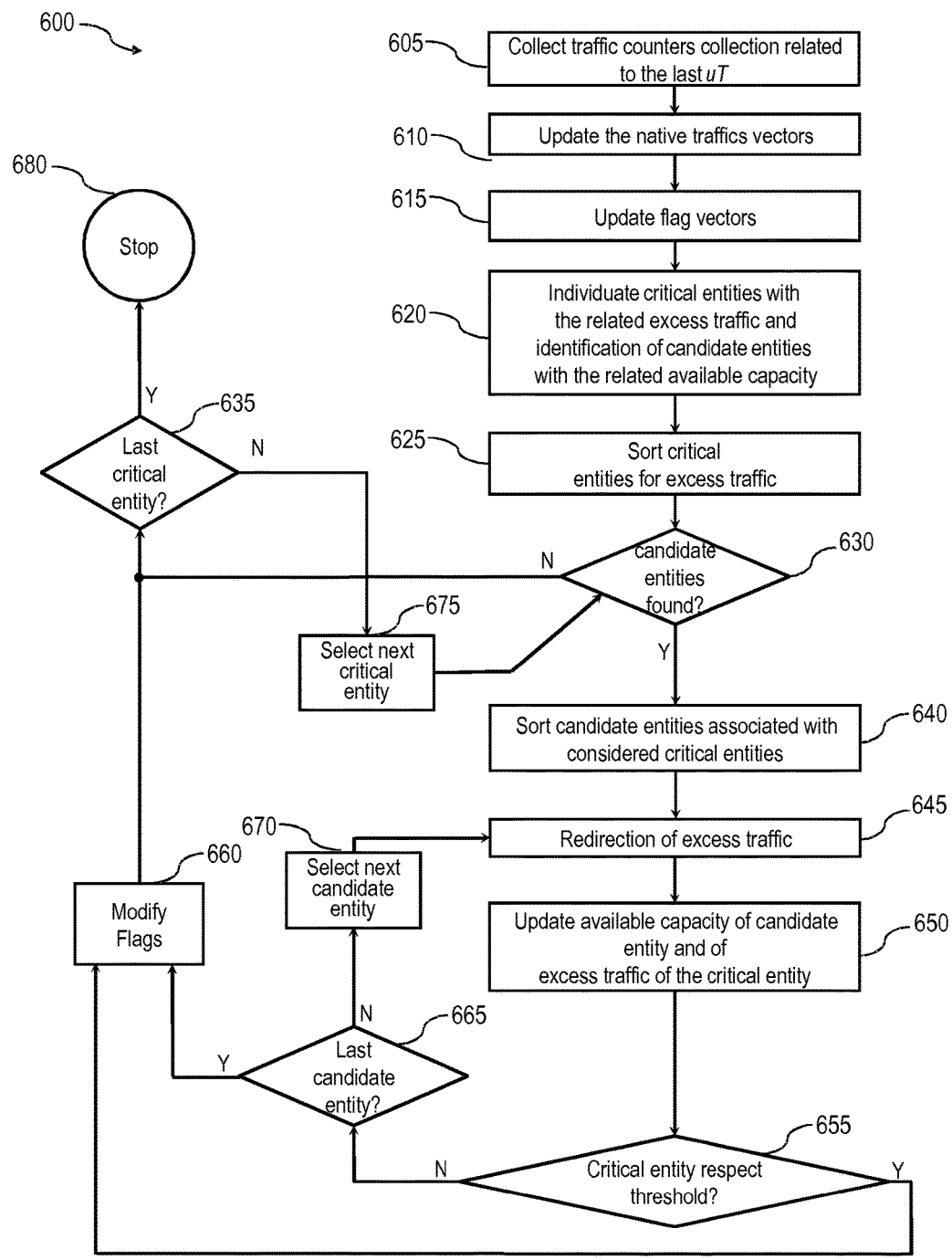
FIG. 6 is a schematic flow diagram of an alternative MLB method according to another embodiment of the present invention.

Turning now to FIG. 6, it is a schematic flow diagram of an alternative MLB method 600 according to another embodiment of the present invention.

The MLB method 600 according to the present invention differs from the MLB method 200 in the following.

The MLB method 600 is based on an analysis of traffic load counters tfc collected over a observation period T' of, for example, a single day, which are preferably updated at each observation sub-period uT' having a higher periodicity. Preferably, the observation sub-periods uT' are set equal to time intervals dt' previously considered and therefore in the following reference will be made simply to time intervals dt'.

For example, time intervals may be set to be 15 to 60 minutes long, i.e. 24 to 96 update time intervals dt' are comprised in a 24 hours long observation period T'.

Initially (block 605), a traffic load counters update is performed. Traffic load counters tfc of the last time interval dt', e.g. last time interval, and related to the radio base stations 105 and/or cells 110 to be managed by MLB method 600, are collected.

Preferably, the monitoring element 120 collects, and stores in the storage element 125, a traffic load counter tfc during each time interval dt' for each radio base station 105 and/or cell 110 of the radio base stations 105 and/or cells 110.

In one embodiment of the present invention, the traffic load counters tfc comprise an information regarding a carried traffic (for example measured in Erlang) Carried_Data_Erlang$_{entity}$, or CDE$_{entity}$ (where "entity" denotes the considered radio base station 105 and/or cell 110) carried by each radio base station 105 and/or cell 110 of the radio base stations 105 and/or cells 110.

In one embodiment of the present invention, the CDE$_{entity}$ may be directly exploited as KPI in order to determine critical and/or candidate radio base stations 105 and/or cells 110, i.e.:

$$KPI_{entity}=CDE_{entity}, \quad (17)$$

wherein KPI$_{entity}$ is the KPI referred to the radio base station 105 and/or cell 110 associated with the CDE$_{entity}$.

Also in the case of the MLB method 600 other types of KPI (eventually expressed as a function of different counters provided in the mobile telecommunication network 100) may be considered in order to optimise the traffic load of the 'entities' (i.e., radio base station 105 and/or cell 110) of the mobile telecommunication network 100 managed by the MLB method 600.

Subsequently (block 610), 'native' traffic load counters vectors are generated or updated on a per radio base stations 105 and/or cells 110 basis. Preferably, a native traffics counter element, referred to a last time interval, is generated or updated on per radio base stations 105 and/or cells 110 and inserted into the corresponding native traffic load counters vector while a first element thereof is discarded. In other words, the observation period T defines a wideness of an observation window which is shifted at a pace corresponding to an observation sub-period uT.

Figure 7:
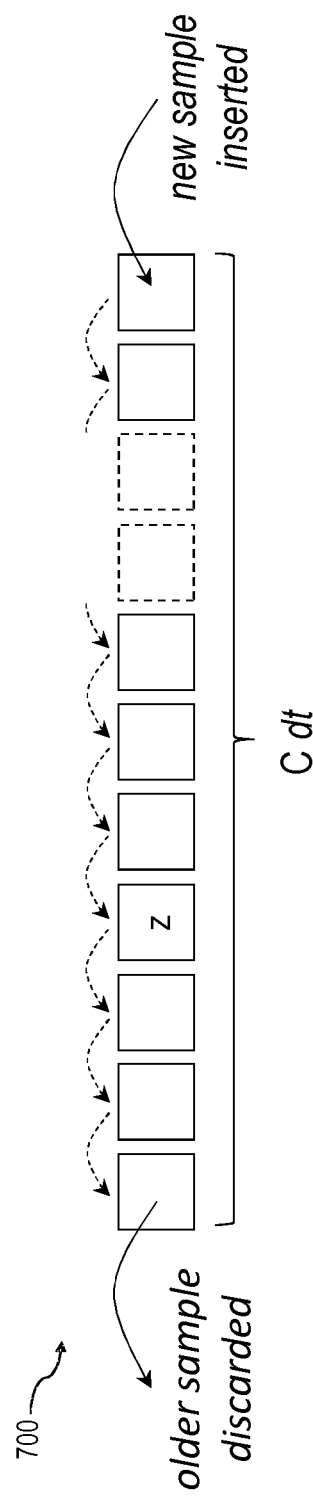
FIG. 7 is a schematic representation of native traffic load counters vector referred to a radio base station and/or cell of the mobile telecommunication network.

As schematically shown in FIG. 7, a native traffic load counters vector 700 referred to a radio base station 105 and/or cell 110 basis comprises E elements, one for each time interval dt', e.g. a day, thus E=24 to 96 in the example of FIG. 6, of the observation period T. In other words, each generic element z of the native traffic load counters vector 700 corresponds to a traffic load counter tfc associated with the radio base station 105 and/or cell 110 to which the native traffic load counters vector 700 is referred.

In addition, for each radio base station 105 and/or cell 110 a flags vector is generated or updated. Flags vector are built starting from native traffic load counters vector.

Figure 8:
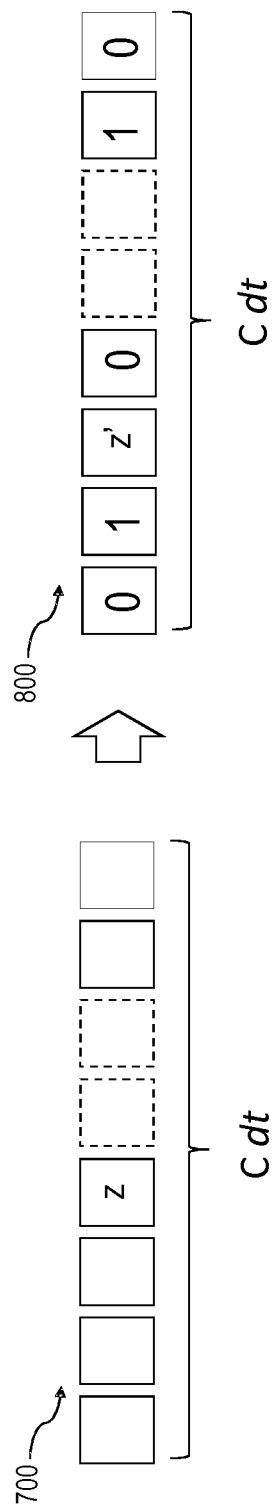
FIG. 8 is a schematic representation of a flags vector based on the native counters vector of FIG. 7.

For example, as schematically shown in FIG. 8, a generic a flags vector 800 comprises E elements or flags, one for each time interval dt', e.g. a day, thus E=24 to 96 in the example of FIG. 6, of the observation period T. Each generic flag z' of a flags vector 800 related to a corresponding time interval dt' may be set to zero (0) or to one (1).

In one embodiment of the present invention, the generic flag z' of a flags vector 800 is set to one whether the time interval dt' is considered critical for the radio base station 105 and/or cell 110 is considered critical, else the flag z' is set to zero.

Also in the MLB method 600 a 'critical' time interval cdt' is defined as a time interval dt' during which a radio base station 105 and/or cell 110 of the radio base stations 105 and/or cells 110 is subjected to a excessive traffic load.

In one embodiment of the invention, a radio base station 105 and/or cell 110 is considered to be is subjected to an excessive traffic load during a critical time interval cdt' whether the KPI$_{entity}$ referred to the time interval dt' exceed a corresponding maximum value KPI$_{max}$:

$$KPI_{entity}>KPI_{max}, \text{ or} \quad (18)$$

$$KPI_{entity}>KPI_{max}=CDE_{max}, \quad (18bis)$$

in case CDE$_{entity}$ are directly exploited as KPI.

Through the flags vector 800, for each radio base station 105 and/or cell 110 are identified (block 620, e.g. by the processing element 130):

a total number of critical time intervals $N_{timeintv}^{crit,tot}$, i.e. critical time interval cdt' detected within the observation period T, and a number of consecutive critical time intervals $N_{timeintv}^{crit,cons}$, i.e. critical time interval cdt' preferably counted from the last time intervals dt' acquired within the observation period T.

a number of consecutive non-critical time intervals $N_{timeintv}^{non-crit,cons}$, i.e. non-critical time interval cdt' counted from the last time intervals dt' acquired within the observation period T.

The total number of critical time intervals $N_{timeintv}^{crit,tot}$ and the number of consecutive critical time intervals $N_{timeintv}^{crit,cons}$ are exploited for evaluating which radio base stations 105 and/or cells 110 of the radio base stations 105 and/or cells 110 are critical.

In one embodiment of the invention, a generic radio base station 105 and/or cell 110 is identified (e.g., by the first operating element 135) as a critical radio base stations 105 and/or cells 110 whether it satisfies at least one of the following conditions:

$$N_{timeintv}^{crit,tot} \geq N_{timeintv}^{thr,crit,tot}, \quad (19)$$

where $N_{timeintv}^{thr,crit,tot}$ is a critical time interval threshold (e.g., stored in the repository element 145) indicating a minimum number of critical time intervals cdt' within an observation period above which the generic radio base station 105 and/or cell 110 is considered critical, and $$N_{timeintv}^{crit,cons} \geq N_{timeintv}^{thr,crit,cons}, \quad (20)$$

where $N_{timeintv}^{thr,crit,cons}$ is a critical consecutive time interval threshold (e.g., stored in the repository element 145) indicating a minimum number of consecutive of critical time intervals cdt within the observation period T and, preferably, counted from the last time interval dt acquired, above which the generic radio base station 105 and/or cell 110 is considered critical.

The critical time interval threshold $N_{timeintv}^{thr,crit,tot}$ and the critical consecutive time interval threshold $N_{timeintv}^{thr,crit,cons}$ are preferably defined empirically on the basis of the impact on the operation of the mobile communication network 100 as described above with respect to the MLB method 200.

It should be noted that a 'sensitivity to criticality' of the MLB method 600 may be adjusted by selecting as a criterion for identifying as critical the radio base stations 105 and/or cells 110 one among the following: verifying only a selected one between condition (19) and (20), verifying one between condition (19) and (20) (i.e., a Boolean logic OR operation), or verifying both condition (19) and (20) (i.e., a Boolean logic AND operation) similarly as described above with respect to the MLB method 200.

Conversely, if the total number of critical time intervals $N_{timeintv}^{crit,tot}$ and the number of consecutive critical time intervals $N_{timeintv}^{crit,cons}$ associated with the generic radio base station 105 and/or cell 110 does not satisfy condition (19) or/and (20), it may be identified (e.g., by the second operating element 140) as a candidate radio base station 105 and/or cell 110 whether it satisfies at least one of the following conditions:

$$N_{timeintv}^{crit,tot} < N_{timeintv}^{thr,cand,tot}, \quad (21)$$

where $N_{timeintv}^{thr,cand,tot}$ is a candidate time interval threshold (e.g., advantageously stored in the repository element 145) indicating a maximum number of critical time intervals cdt detected within an observation period T below which the generic radio base station 105 and/or cell 110 is considered a possible candidate, and $$N_{timeintv}^{non-crit,cons} \geq N_{timeintv}^{thr,non-crit,cons}, \quad (22)$$

where $N_{timeintv}^{thr,non-crit,cons}$ is a candidate consecutive time interval threshold (e.g., advantageously stored in the repository element 145) indicating a minimum value of number of consecutive non critical time intervals cdt within the observation period T and, preferably, counted from the last interval acquired above which the generic radio base station 105 and/or cell 110 is considered a possible candidate.

Again, the candidate time interval threshold $N_{timeintv}^{thr,cand,tot}$ and the candidate consecutive time interval threshold $N_{timeintv}^{thr,non-crit,cons}$ are preferably defined empirically on the basis of the impact on the operation of the mobile communication network 100 with similar criteria described above with respect to the MLB method 200.

It should be noted that a 'sensitivity to candidability' of the MLB method 600 may be adjusted by selecting as a criterion for identifying as candidate the radio base stations 105 and/or cells 110 one among the following: verifying a selected one between condition (19) and (20), verifying one between condition (19) and (20) (i.e., a Boolean logic OR operation), or verifying both condition (19) and (20) (i.e., a Boolean logic AND operation) similarly as described above with respect to the MLB method 200.

It should be noted that the thresholds of the relations from (19) up to (22) should respect the following conditions:

$$N_{timeintv}^{thr,crit,cons} < N_{timeintv}^{thr,crit,tot}; \quad (23)$$

$$N_{timeintv}^{thr,cand,tot} \leq N_{timeintv}^{thr,crit,tot}, \text{ and} \quad (24)$$

$$N_{timeintv}^{thr,cand,tot} \leq N_{timeintv}^{thr,crit,cons}. \quad (25)$$

For each radio base station 105 and/or cell 110 of the set of radio base stations 105 and/or cells 110 identified as critical (e.g., by the first operating element 135) an excess portion $KPI_{entity}^{exc}$ of the value of the corresponding KPI with respect to a corresponding maximum KPI value is determined.

Preferably, the excess portion $KPI_{entity}^{exc}$ is calculated according to one of the following alternatives:

$$KPI_{entity}^{exc} = KPI_{timeintv}^{max,crit} - KPI_{max}, \quad (10)$$

where $KPI_{timeintv}^{max,crit}$ is, in the example of FIG. 6, an actual maximum KPI value individuated among the elements of the correspoding native traffic load counters vector 700 associated with critical time intervals cdt', or $$KPI_{entity}^{exc} = KPI_{timeintv}^{avg,crit} - KPI_{max}, \quad (11)$$

where $KPI_{timeintv}^{avg,crit}$ is, in the example of FIG. 6, an averaged maximum KPI estimated averaging the values of the elements of the corresponding native traffic load counters vector 700 associated with critical time intervals cdt'.

Conversely, for each radio base station 105 and/or cell 110 of the set of radio base stations 105 and/or cells 110 identified as candidate (e.g., by the second operating element 140) it is identified a KPI availability $KPI_{entity}^{avlb,timeintv}$, i.e. accounting for resources available at the candidate radio base station 105 and/or cell 110 to be occupied/used by a part of the load of the critical radio base stations 105 and/or cells 110.

Preferably, KPI availability $KPI_{entity}^{avlb,timeintv}$ in a generic time interval dt' is expressed by the relation:

$$KPI_{entity}^{avlb,timeintv} = \max(0, KPI_{max} - KPI_{entity}^{timeintv}), \quad (12)$$

where $KPI_{entity}^{timeintv}$ is the value of the KPI of the candidate radio base station 105 and/or cell 110 during the considered time interval dt'.

Using the relation (12), a KPI availability $KPI_{entity}^{avlb}$ associated with the candidate radio base station 105 and/or cell 110 is calculated.

Preferably, the KPI availability $KPI_{entity}^{avlb}$ associated with the candidate radio base station 105 and/or cell 110 is calculated according to one of the following alternatives:

$$KPI_{entity}^{avlb} = KPI_{max} - KPI_{timeintv}^{max,nocrit}, \quad (13)$$

where $KPI_{timeintv}^{max,nocrit}$ is, in the example of FIG. 6, a maximum available KPI value the elements of the of the native traffic load counters vector 700 associated with non-critical time intervals dt', or $$KPI_{entity}^{avlb} = KPI_{max} - KPI_{timeintv}^{avg,nocrit}, \quad (14)$$

where $KPI_{timeintv}^{avg,nocrit}$ is, in the example of FIG. 6, an averaged available KPI estimated averaging the values of the element of the corresponding native traffic load counters vector 700 associated with non-critical time intervals dt'.

After the individuation of the set of the critical radio base stations 105 and/or cells 110 and of the set of candidate radio base stations 105 and/or cells 110, critical radio base stations 105 and/or cells 110 are sorted in a critical entities list crit_List (block 625) on the basis of the value of the excess portion $KPI_{entity}^{exc}$ as discussed before.

Preferably the first critical radio base station 105 and/or cell 110 of the critical entities list crit_List, is initially selected in order to redistribute its excessive part of its traffic load.

Next, it is searched (decision block 630) a candidates subset radio base stations 105 and/or cells 110, candidates subset in the following, adapted to take charge of at least part of the excess of traffic load to which the selected critical radio base station 105 and/or cell 110 is subjected.

Preferably, although not limitatively, candidate radio base stations 105 and/or cells 110 of the candidates subset are individuated among all the candidate radio base stations 105 and/or cells 110 on the basis of proximity criteria (e.g., candidate radio base stations 105 and/or cells 110 located adjacent to the considered critical radio base stations 105 and/or cells 110 under analysis).

In the negative case (exit branch N of decision block 630), i.e. no candidate radio base stations 105 and/or cells 110 are individuated among the set of candidate subset radio base stations 105 and/or cells 110, operation proceeds at block 635 described in the following.

In the affirmative case (exit branch Y of decision block 630), i.e. at least one candidate radio base station 105 and/or cell 110 adapted to take charge of at least part of the excess of traffic load of the selected critical radio base station 105 and/or cell 110 is found, the candidate radio base stations 105 and/or cells 110 of the candidates subset are then sorted in a list cand_List (block 640) on the basis of the value of the total KPI availability $KPI_{entity}^{avlb}$.

For example, the candidate radio base stations 105 and/or cells 110 of the candidates subset are listed in a descending order according to a value of the KPI availability $KPI_{entity}^{avlb}$. In other words, candidate radio base stations 105 and/or cells 110 of the subset are listed from a candidate radio base station 105 and/or cell 110 capable of taking charge a highest amount of traffic load (i.e. having the highest KPI availability $KPI_{entity}^{avlb}$) to a base station 105 and/or cell 110 capable of taking charge a smallest amount of traffic load (i.e. having the lowest KPI availability $KPI_{entity}^{avlb}$).

Starting from the first candidate radio base station 105 and/or cell 110 in the candidate entities list cand_List, radio communication parameters of the considered critical radio base station 105 and/or cell 110 and of the candidate radio base station 105 and/or cell 110 are modified (block 645) in such a way that the latter takes charge of at least part of the traffic load of the former. In other words, at least a part of the traffic load is redirected from the considered critical radio base station 105 and/or cell 110 to the candidate radio base station 105 and/or cell 110.

Subsequently (block 650), the excess portion $KPI_{crit,entity}^{exc}$ of the considered critical radio base station 105 and/or cell 110 and the KPI availability $KPI_{cand,entity}^{avlb}$ of the candidate radio base station 105 and/or cell 110 are updated for taking into account the just performed changes in the respective radio communication parameters:

$$KPI_{crit,entity}^{exc,upd} = \max(0, KPI_{crit,entity}^{exc} - KPI_{cand,entity}^{avlb}), \text{ and} \quad (15)$$

$$KPI_{cand,entity}^{avlb,upd} = \max(0, KPI_{cand,entity}^{avlb} - KPI_{crit,entity}^{exc}). \quad (16)$$

The updated excess portion value $KPI_{crit,entity}^{exc,upd}$ is analyzed in order to determine (decision block 655) whether the excessive traffic load of the critical radio base station 105 and/or cell 110 has been completely redistributed.

Preferably, it is checked whether the updated excess portion value $KPI_{crit,entity}^{exc,upd}$ is equal to zero ($KPI_{crit,entity}^{exc,upd}=0$).

In the affirmative case (exit branch Y of decision block 655), the updated excess portion value $KPI_{crit,entity}^{exc,upd}$ is equal to zero, all the excess traffic load the considered critical radio base station 105 and/or cell 110 has been completely redistributed in the mobile telecommunication network 100, and operation proceeds at block 660 that set to zero all the elements of the flags vector 800.

It should be noted that in the MLB method 600 based on an observation period T of a day, i.e. performing a daily traffic load counters analysis, with an observation period equal to a time interval, a mechanism for controlling consecutive iterations of the MLB method 600 on radio communication parameters of a same critical radio base station 105 and/or cell 110 is not implemented (i.e., it is not implemented an operation step corresponding to block 230 of the MLB method 200 previously described) since a critical radio base station 105 and/or cell 110 of which the radio communication parameters have been modified is not reconsidered before a minimum number of iteration of the MLB method 600:

$$\min + (N_{timeintv}^{thr,crit,tot}, N_{timeintv}^{thr,crit,cons}), \quad (26)$$

This operates as an implicit mechanism for avoiding consecutive iterations of the MLB method 600 on a same critical radio base station 105 and/or cell 110. In facts, the 'just helped' radio base station 105 and/or cell 110 with the elements of the corresponding flag vector 800 set to zero may be considered again as being critical at least after a number of iteration (i.e., time intervals dt in the example of FIG. 6) of the MLB method 600 equal to the threshold related to the total number of critical time intervals $N_{timeintv}^{thr,crit,tot}$ or equal to the threshold related to the number of consecutive critical time intervals $N_{timeintv}^{thr,crit,cons}$.

In the negative case (exit branch N of decision block 655), the updated excess portion value $KPI_{crit,entity}^{exc,upd}$ is different from zero, i.e. the excessive traffic load to which the considered critical radio base station 105 and/or cell 110 has not yet been completely redistributed in the mobile telecommunication network 100, thus it is checked (decision block 665) whether the end of the candidate entities list cand_List has been reached or not (i.e., whether the candidate radio base station 105 and/or cell 110 just used for assisting the considered critical radio base station 105 and/or cell 110 was the last in the candidate entities list cand_List).

In the negative case (exit branch N of decision block 665), the end of the candidate entities list cand_List has not been reached, a next candidate radio base station 105 and/or cell 110 from the candidate entities list cand_List adapted to receive at least part of the remaining excessive traffic load associated with the considered critical radio base station 105 and/or cell 110 is selected (block 670) and operation returns to block 645 for redistributing the remaining excessive traffic load of the selected critical radio base station 105 and/or cell 110.

In the affirmative case (exit branch Y of decision block 665), the end of the candidate entities list cand_List has been reached, and operation proceeds at decision block 660.

The considered critical radio base station 105 and/or cell 110 is considered 'helped' (or at least partially helped) and is removed (block 660) from the critical entities list crit_List, all the elements of the corresponding flag vector 800 are set to zero (i.e., the considered critical radio base station 105 and/or cell 110 is not considered critical anymore for a minimum number of new time intervals dt given by the formula (26)).

Subsequently (decision block 635), it is checked whether the end of the critical entities list crit_List has been reached or not (i.e., whether the critical radio base station 105 and/or cell 110 just considered was the last in the critical entities list crit_List).

In the negative case (exit branch N of decision block 635), the end of the critical entities list crit_List has not been reached, a next critical radio base station 105 and/or cell 110 from the critical entities list crit_List is selected (block 675), and operation returns to block 630 for searching candidate radio base stations 105 and/or cells 110 adapted to take charge of at least part of the excess of traffic load of the critical radio base station 105 and/or cell 110 just selected.

In the affirmative case (exit branch Y of decision block 635), the end of the critical entities list crit_List has been reached, thus the MLB method 200 stops the current iteration (block 680).

It should be noted that both the methods according to embodiments of the present invention may be based not only on the use of the traffic load counters coming from network elements of the mobile telecommunication network 100 but also on the use of traffic load forecast obtainable by means of mathematical models capable of providing an estimation of the traffic load on a per radio base station 105 and/or cell 110 basis.

It should be noted that the MLB method 600 is iterated with a frequency corresponding to the observation sub-period uT; i.e. at each time interval dt (every 15-60 minutes).

In a further embodiment of the invention, a traffic estimation process exploits network traffic load counters referred to one or more of previous observation periods, e.g. one or more previous months (different from a current observation period T, e.g. month or day, to be analysed by the MLB method) for extracting traffic trends (e.g., changes in the traffic load over time) associated with each radio base station 105 and/or cell 110 managed through the MLB methods of above.

It should be noted that the MLB methods according the present invention may be implemented totally in software, partly in software and partly in hardware, or totally in hardware within the mobile communication network 100.

For example, the method according to an embodiment of the present invention may be implemented by a properly programmed computer or network of computers, possibly geographically distributed and integrated in the mobile telecommunication network 100; preferably the MLB methods 200 and 600 according the present invention are implemented in a hardware/software suite capable to implement a set of SON features and algorithms.

The invention claimed is:

1. A method of balancing a traffic load among at least a part of traffic managing entities of a mobile telecommunication network comprising a plurality of traffic managing entities, the method comprising:
   collecting traffic-related data referred to said at least a part of the traffic managing entities;
   generating a matrix for the at least a part of the traffic managing entities, a first dimension of the matrix corresponding to observation time sub-periods of an observation time period, a second dimension of the matrix corresponding to a performance index determined based on the traffic-related data;
   identifying a first set of traffic managing entities managing an excessive traffic load based on the matrix;
   identifying a second set of traffic managing entities configured to take charge of at least part of the excessive traffic load to which traffic managing entities of the first set of traffic managing entities are subjected;
   for each traffic managing entity of the first set of traffic managing entities:
   determining at least one traffic managing entity of the second set of traffic managing entities configured to take charge of at least part of the excessive traffic load managed by said traffic managing entity of the first set of traffic managing entities,
   assigning at least part of the excessive traffic load to which said traffic managing entity of first set of traffic managing entities is subjected to the determined at least one least one traffic managing entity of the second set of traffic managing entities, and
   adjusting radio communication parameters of said traffic managing entity of the first set of traffic managing entities and of said determined at least one traffic managing entity of the second set of traffic managing entities to redistribute traffic load.

2. The method according to claim 1, wherein the step of collecting traffic-related data referred to said at least a part of the traffic managing entities comprises:
   either collecting traffic load counters from at least a part of traffic managing entities of a mobile telecommunication network, or
   collecting traffic load forecasts obtainable by mathematical models providing an estimation of traffic load managed by the at least a part of traffic managing entities of a mobile telecommunication network.

3. The method according to claim 1, wherein the step of collecting traffic-related data referred to said at least a part of traffic managing entities comprises:
   collecting at least one traffic-related datum of said traffic-related data during each one of the observation time sub-periods comprised in the observation time period.

4. The method according to claim 3, wherein collecting at least one traffic-related datum of said traffic-related data during each one of the observation time sub-periods comprised in the observation time period further comprises:
   collecting a traffic-related datum of the at least one of said traffic-related data during a corresponding time interval, each observation time sub-period comprising at least one time interval.

5. The method according to claim 3, further comprising, for each traffic managing entities of said at least a part of traffic managing entities, at least one among:
   determining a number of observation time sub-periods of said observation time period during at least part of which the traffic managing entity manages an excessive traffic load based on the traffic-related data;
   determining a first number of consecutive observation time sub-periods of said observation time period during at least part of which the traffic managing entity manages an excessive traffic load based on the traffic-related data,
   determining a second number of consecutive observation time sub-periods counted of said observation time period during at least part of which the traffic managing entity does not manages an excessive traffic load based on the traffic-related data.

6. The method according to claim 4, further comprising for each traffic managing entities of said at least a part of traffic managing entities:
   determining an average number of time intervals of the observation time period during which the traffic managing entity manages an excessive traffic load based on the traffic-related data.

7. The method according to claim 6, wherein determining an average number of time intervals of the observation time period during which the traffic managing entity manages an excessive traffic load based on the traffic-related data comprises:
   averaging a total number of time intervals of the observation time period during which the traffic managing entity manages an excessive traffic load by a number of observation time sub-periods of said observation time period during at least part of which the traffic managing entity manages an excessive traffic load.

8. The method according to claim 5, wherein the step of determining a first number of consecutive observation time sub-periods of said observation time period during at least part of which the traffic managing entity manages an excessive traffic load based on the traffic-related data comprises:
   counting the first number of consecutive observation time sub-periods starting from a last observation sub-period of the observation period, and
   wherein the step of determining a second number of consecutive observation time sub-periods counted of said observation time period during at least part of which the traffic managing entity does not manages an excessive traffic load based on the traffic-related data comprises:
   counting the second number of consecutive observation time sub-periods starting from a last observation sub-period of the observation period.

9. The method according to claim 5, wherein the step of identifying a first set of traffic managing entities managing an excessive traffic load based on the traffic-related data comprises:
   identifying a traffic managing entity as belonging to the first set of traffic managing entities when at least one of:
   said number of observation time sub-periods of said observation time period during at least part of which a traffic managing entity manages an excessive traffic load is equal to, or greater than, a corresponding number threshold, and said first number of consecutive observation time subperiods of said observation time period during at least part of which a traffic managing entity manages an excessive traffic load is equal to, or greater than, a corresponding consecutive number threshold.

10. The method according to claim 6, wherein the step of identifying a first set of traffic managing entities managing an excessive traffic load based on the traffic-related data further comprises:
identifying a traffic managing entity as belonging to the first set of traffic managing entities when:
said average number of time intervals of the observation time period during which the traffic managing entity manages an excessive traffic load based on the traffic-related data is equal to, or greater than, a corresponding average number threshold.

11. The method according to claim 5, wherein the step of identifying a second set of traffic managing entities configured to take charge of at least part of the excessive traffic load to which traffic managing entities of first set of traffic managing entities are subjected based on the traffic-related data comprises:
identifying a traffic managing entity as belonging to the second set of traffic managing entities when at least one of:
said number of observation time sub-periods of said observation time period for which the traffic managing entity does manage an excessive traffic load is lower than a corresponding further number threshold, and
said second number of consecutive observation time sub-periods of said observation time period during at least part of which a traffic managing entity does not manage an excessive traffic load is equal to, or greater than, a corresponding further consecutive number threshold.

12. The method according to claim 6, wherein the step of identifying a second set of traffic managing entities configured to take charge of at least part of the excessive traffic load to which traffic managing entities of first set of traffic managing entities are subjected based on the traffic-related data further comprises:
identifying a traffic managing entity as belonging to the second set of traffic managing entities when:
said average number of time intervals of the observation time period during which the traffic managing entity manages an excessive traffic load based on the traffic-related data is lower than a corresponding further average number threshold.

13. The method according to claim 1, wherein the step of determining at least one traffic managing entity of the second set of traffic managing entities configured to take charge of at least part of the excessive traffic load managed by said traffic managing entity of the first set of traffic managing entities comprises:
selecting said at least one traffic managing entity of the second set of traffic managing entities based on a proximity to said traffic managing entity of the first set of traffic managing entities.

14. The method according to claim 3, wherein collecting at least one of said traffic-related data during each one of a plurality of observation time sub-periods comprised in an observation time period further comprises:
collecting at least one of said traffic-related data during consecutive observation time sub-periods, and
considering as observation time period a predefined number of observation time sub-periods by discarding an oldest observation time sub period of the predefined number of observation time sub periods whenever at least one of said traffic-related data are collected in a newest observation time sub-period.

15. The method according to claim 1, wherein the step of determining at least one traffic managing entity of the second set of traffic managing entities configured to take charge of at least part of the excessive traffic load managed by said traffic managing entities of the first set of traffic managing entities comprises:
evaluating an amount of excessive traffic load of each traffic managing entity of the first set of traffic managing entities, and
determining at least one traffic managing entity of the second set of traffic managing entities configured to take charge of at least part of the excessive traffic load of each traffic managing entity of the first set of traffic managing entities starting from a traffic managing entity of the first set of traffic managing entities associated with a greater amount of excessive traffic load.

16. The method to claim 15, wherein the step of determining at least one traffic managing entity of the second set of traffic managing entities configured to take charge of at least part of the excessive traffic load managed by said traffic managing entities of the first set of traffic managing entities comprises:
evaluating an amount of traffic load that may be took in charge by each traffic managing entity of the second set of traffic managing entities, and
wherein said determined at least one traffic managing entity of the second set of traffic managing entities comprises two or more traffic managing entities of the second set of traffic managing entities, and the step of assigning at least part of the excessive traffic load to which said traffic managing entity of first set of traffic managing entities is subjected to the two or more one traffic managing entities of the second set of traffic managing entities comprises:
adjusting radio communication parameters of said two or more traffic managing entities of the second set of traffic managing entities starting from a traffic managing entity of said two or more traffic managing entities of the second set of traffic managing entities which has been evaluated as able to take in charge a greatest amount of traffic load.

17. The method according to claim 4, wherein the step of identifying a first set of traffic managing entities managing an excessive traffic load based on the traffic-related data comprises for each traffic managing entities at least a part of traffic managing entities comprises:
determining a corresponding performance indicator referred to traffic-related data in each time interval comprised in the observation time sub-periods of the observation time period, and
considering a traffic managing entities managing an excessive traffic load during a time interval whether the corresponding performance indicator trespasses a predetermined performance indicator threshold.

18. The method according to claim 17, wherein determining a corresponding performance indicator referred to each time interval comprised in the observation time sub-periods of the observation time period comprises:
determining a corresponding average performance indicator referred to each one of the time intervals by summing together all the performance indicator referred to corresponding time interval in different observation time sub-periods and dividing by a total number of observation time sub-period comprised in the observation time period.

19. The method according to claim 17, further comprising
setting the observation time sub-period to a day and the observation time period to at least a week, and
wherein determining a corresponding performance indicator referred to each time interval comprised in the observation time sub-periods of the observation time period comprises:
determining a corresponding a first average performance indicator referred to each one of the time intervals associated with a time observation sub-period corresponding to a working day by summing together all the performance indicator referred to corresponding time interval in different observation time sub-periods corresponding only to working days and dividing by a total number of observation time sub-period corresponding only to working days comprised in the observation time period set to at least one week, or
determining a corresponding a second average performance indicator referred to each one of the time intervals associated with a time observation sub-period corresponding to a non-working day by summing together all the performance indicator referred to corresponding time interval in different observation time sub-periods corresponding only to non-working days and dividing by a total number of observation time sub-period corresponding only to non-working days comprised in the observation time period set to at least one week.

20. The method according to claim 17, further comprising
setting the observation time sub-period to a day and the observation time period to at least two weeks, and
wherein determining a corresponding performance indicator referred to each time interval comprised in the observation time sub-periods of the observation time period comprises:
determining a corresponding average performance indicator referred to each one of the time intervals associated with a time observation sub-period corresponding to a same day of a week by summing together all the performance indicator referred to corresponding time interval in different observation time sub-periods corresponding only to corresponding days of the at least two weeks and dividing by a total number of observation time sub-periods corresponding only to corresponding days of the time period set to at least two weeks.

21. The method according to claim 17, further comprising setting the observation time sub-period equal to a time interval and the observation time equal to a day.

22. A mobile telecommunication network comprising:
a plurality of base stations configured to manage traffic in the mobile telecommunication network;
a monitoring element stored on a machine that includes a processor and memory and is configured to collect traffic-related data referred to at least a part of the plurality of base stations;
a first operating element stored on a machine that includes a processor and memory and is configured to
generate a matrix for the at least a part of the plurality of base stations, a first dimension of the matrix corresponding to observation time sub-periods of an observation time period, a second dimension of the matrix corresponding to a performance index determined based on the traffic-related data, and
identify a first set of base stations managing an excessive traffic load based on the traffic-related data;
a second operating element stored on a machine that includes a processor and memory and is configured to identify a second set of base stations configured to take charge of at least part of the excessive traffic load to which base stations of first set of base stations are subjected;
an engine element stored on a machine that includes a processor and memory and that, for each base station of the first set of base stations, is configured to:
determine at least one base station of the second set of base stations configured to take charge of at least part of the excessive traffic load managed by said base station of the first set of base stations,
assign at least part of the excessive traffic load to which said base station of first set of base stations is subjected to the determined at least one least one base station of the second set of base stations, and
adjust radio communication parameters of said base station of the first set of base stations and of said determined at least one base station of the second set of base stations.

* * * * *